United States Patent
Yun et al.

(10) Patent No.: US 9,912,515 B2
(45) Date of Patent: Mar. 6, 2018

(54) PACKET TRANSMISSION METHOD AND APPARATUS FOR USE IN FILTER BANK-BASED MULTI-CARRIER WIRELESS COMMUNICATION

(71) Applicants: Samsung Electronics Co., Ltd, Suwon-si (KR); Industry-Academic Cooperation Foundation, Yonsei University, Seoul (KR)

(72) Inventors: Yeohun Yun, Hwaseong-si (KR); Sooyong Choi, Seoul (KR); Hyungju Nam, Seoul (KR); Wonsuk Chung, Seoul (KR); Moonchang Choi, Seoul (KR); Seongbae Han, Seoul (KR); Daesik Hong, Seoul (KR)

(73) Assignees: SAMSUNG ELECTRONICS CO., LTD., Suwon-si, Gyeonggi-do (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 12 days.

(21) Appl. No.: 14/997,867

(22) Filed: Jan. 18, 2016

(65) Prior Publication Data
US 2016/0212004 A1    Jul. 21, 2016

(30) Foreign Application Priority Data
Jan. 16, 2015   (KR) .................. 10-2015-0007994

(51) Int. Cl.
*H04L 5/12*     (2006.01)
*H04L 23/02*    (2006.01)
(Continued)

(52) U.S. Cl.
CPC ........ *H04L 27/2698* (2013.01); *H04L 27/264* (2013.01); *H04L 27/2628* (2013.01); *H04L 27/3405* (2013.01)

(58) Field of Classification Search
None
See application file for complete search history.

(56) References Cited

U.S. PATENT DOCUMENTS

| | | |
|---|---|---|
| 8,743,982 B2 | 6/2014 | Bellanger |
| 2013/0148488 A1* | 6/2013 | Gao .................... H04L 27/2698 370/210 |

(Continued)

*Primary Examiner* — Chieh M Fan
*Assistant Examiner* — Gina McKie

(57) ABSTRACT

The present disclosure relates to a pre-5th-Generation (5G) or 5G communication system to be provided for supporting higher data rates Beyond 4th-Generation (4G) communication system such as Long Term Evolution (LTE).

A packet transmission method and apparatus for use in a wireless communication system and, in particular, for transmitting packets in a filter bank-based multicarrier wireless communication system. The packet transmission method for use in a wireless communication system based on Filter Bank-based Multi-Carrier (FBMC) includes generating an Offset Quadrature Amplitude Modulation (OQAM) symbol by extracting a transmission data period from data blocks obtained by repeating a transmission data as many times as an overlapping factor, performing Inverse Fast Fourier Transform (IFFT) on the OQAM symbol, shifting, when the overlapping factor is an even number, the IFFT-ed symbol cyclically, filtering the cyclically shifted symbol with a shortened compensation filter, and transmitting the filtered symbol in an overlapped OQAM signal.

17 Claims, 20 Drawing Sheets

(51) Int. Cl.
 *H04L 27/26* (2006.01)
 *H04L 27/34* (2006.01)

(56) References Cited

U.S. PATENT DOCUMENTS

2013/0286959 A1* 10/2013 Lou .................. H04W 72/04
 370/329
2015/0289292 A1* 10/2015 Sun .................. H04W 74/0833
 370/329

* cited by examiner

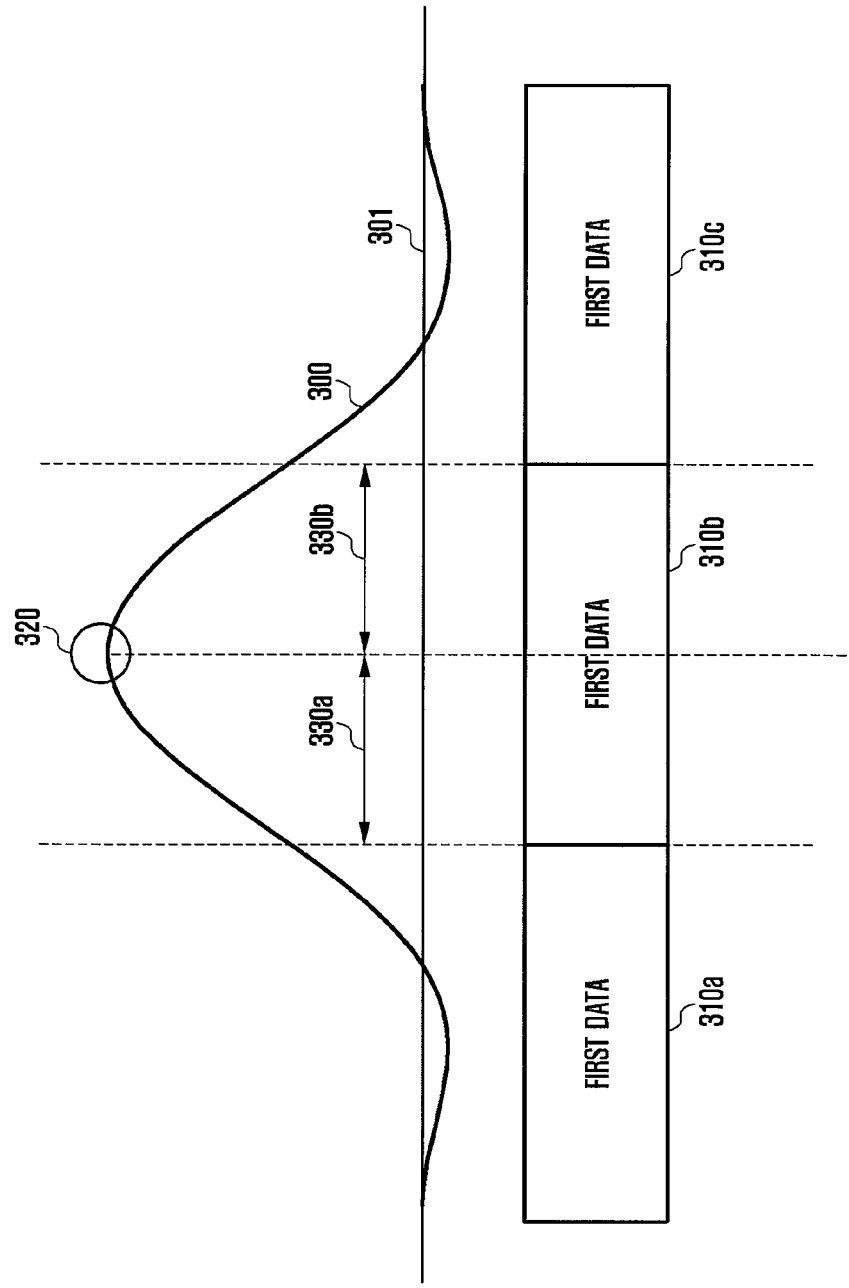

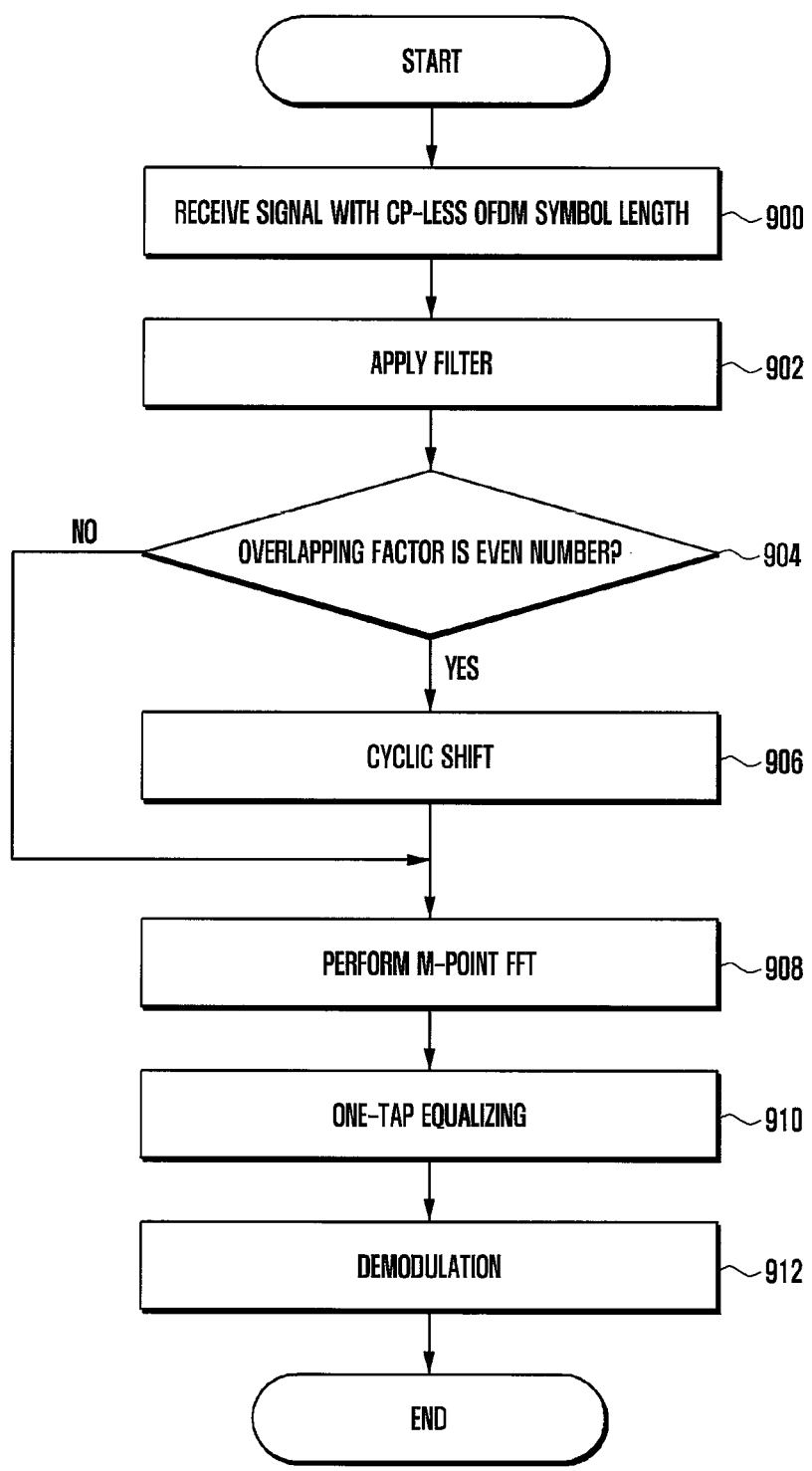

PACKET TRANSMISSION METHOD AND APPARATUS FOR USE IN FILTER BANK-BASED MULTI-CARRIER WIRELESS COMMUNICATION

CROSS-REFERENCE TO RELATED APPLICATION AND CLAIM OF PRIORITY

The present application is related to and claims the benefit under 35 U.S.C. § 119(a) of a Korean patent application filed on Jan. 16, 2015, in the Korean Intellectual Property Office and assigned Serial No. 10-2015-0007994, the entire disclosure of which is hereby incorporated by reference.

TECHNICAL FIELD

The present disclosure relates to a packet transmission method and apparatus for use in a wireless communication system and, in particular, to a method and apparatus for transmitting packets in a filter bank-based multicarrier wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the increasing demand for mobile data services, Code Division Multiple Access (CDMA), as one of the representative 3rd Generation (3G) technologies, has been replaced by Orthogonal Frequency Division Multiple Access (OFDMA) in order to meet the data rate requirements of the 4th Generation (4G) communication standard. In the OFDMA system, data is transmitted using a plurality of orthogonal frequency components in order to increase the data rate in comparison with a 3G wireless communication system, the CDMA system. The OFDMA is adopted in various wireless communication systems such as Wireless Broadband (Wibro) as well as Long Term Evolution (LTE) and LTE-Advanced (LTE-A).

However, the exponential growth of mobile data traffic spurs the development of a next generation wireless communication system capable of accommodating more traffic; therefore, there is a need of a technology capable of transmitting more data than the current OFDMA.

FBMC is one of the potential candidates capable of accommodating the increasing data traffic and replacing OFDMA.

In comparison with the OFDMA system, the FBMC system does not require redundant Cyclic Prefix (CP) in order to obtain a large gain in the symbol transmission rate in the time domain. Furthermore, using a filter with a good spectral confinement characteristic makes it possible to reduce the number of guard carriers in the guard band.

With regard to the transmission signal, the FBMC system is characterized in that the filter occupies a long period on the time axis and the symbols are overlapped to increase the symbol transmission rate. As a result, this technique makes it possible to secure the symbol transmission rate almost equal to the rate of transmitting OFDM symbols without CP in the legacy CP-OFDM system, especially when continuously transmitting long strings of data.

However, even in the FBMC-based wireless communication, it still takes a long time to transmit data in a short burst transmission scenario on the time axis, which results in degradation of transmission efficiency.

SUMMARY

To address the above-discussed deficiencies, it is a primary object to provide a packet transmission method and apparatus for protecting against transmission efficiency degradation caused by overlapped transmission in a Filter Bank Multi-Carrier (FBMC) communication system.

Also, the present disclosure provides a packet transmission method and apparatus for guaranteeing high power spectral efficiency in comparison with an OFDM scheme in the FBMC communication system.

Also, the present disclosure provides a packet transmission method and apparatus for achieving a high Bit Error Ratio (BER) even in the multi-path delay environment in the FBMC communication system.

In accordance with an aspect of the present disclosure, a packet transmission method for use in a wireless communication system based on Filter Bank-based Multi-Carrier (FBMC) is provided. The packet transmission method includes generating an Offset Quadrature Amplitude Modulation (OQAM) symbol by extracting a transmission data period from data blocks obtained by repeating a transmission data as many times as an overlapping factor; performing Inverse Fast Fourier Transform (IFFT) on the OQAM symbol; shifting, when the overlapping factor is an even number, the IFFT-ed symbol cyclically; filtering the cyclically shifted symbol with a shortened compensation filter; and transmitting the filtered symbol in an overlapped OQAM signal.

In accordance with another aspect of the present disclosure, a packet transmission apparatus for use in a wireless communication system based on Filter Bank-based Multi-Carrier (FBMC) is provided. The packet transmission apparatus includes a symbol generator which extracts a transmission data period from data blocks obtained by repeating a transmission data as many times as an overlapping factor and outputs an Offset Quadrature Amplitude Modulation (OQAM) symbol using the extracted transmission data period, an Inverse Fast Fourier Transform (IFFT) processor which performs IFFT on the OQAM symbol, a transmission filter unit which filters the IFFT-ed symbol with a shortened compensation filter, an OQAM overlapping unit which overlaps the filtered symbol in an overlapped OQAM signal, a switch which switches an output of the IFFT processor to a cyclic shift processor or the transmission filter unit, and a transmission controller which controls the switch based on a size of the transmission data and the overlapping factor.

In accordance with another aspect of the present disclosure, a packet reception method for use in a wireless communication system based on Filter Bank-based Multi-Carrier (FBMC) is provided. The packet reception method includes outputting a base band signal by processing a symbol with an FBMC length; filtering the baseband signal with a prototype filter used in the FBMC system; shifting, when an overlapping factor of the FBMC system is an even number, the filtered data cyclically; performing M-point Fast Fourier Transform (FFT) on the cyclically shifted data, equalizing the FFT-ed data, and demodulating the equalized data.

In accordance with still another aspect of the present disclosure, a packet reception apparatus for use in a wireless communication system based on Filter Bank-based Multi-Carrier (FBMC) is provided. The packet reception apparatus includes a signal reception unit which outputs a base band signal by processing a symbol with an FBMC length; a reception filter unit which filters the baseband signal with a prototype filter used in the FBMC system; a cyclic shift processor which shifts the filtered data cyclically; a Fast Fourier Transform (FFT) processor which performs M-point FFT on the cyclically shifted data; an equalizer which equalizes the FFT-ed data; a demodulator which demodulates the equalized data; a switch which switches an output of the reception filter to the cyclic shift processor or the FFT processor; and a reception controller which controls, when data bursts are received and the overlapping factor of the FBMC system is an even number, the switch to switch the output of the reception filter to the cyclic shift processor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3B is a diagram illustrating how to generate an FBMC symbol by applying a PHYDYAS filter to the overlapped data in an FBMC system with the overlapping factor of 3;

FIG. 9 is a flowchart illustrating a data reception procedure of a reception apparatus for receiving the FBMC symbol carrying data to which the transmission has not performed any cyclic shift according to another embodiment of the present disclosure;

DETAILED DESCRIPTION

FIGS. 1 through 10C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Exemplary embodiments of the present disclosure are described with reference to the accompanying drawings in detail. The same reference numbers are used throughout the drawings to refer to the same or like parts. The drawings are provided to help understanding the present disclosure, and they are not intended to limit the present disclosure in shape and arrangement. Detailed descriptions of well-known functions and structures incorporated herein may be omitted to avoid obscuring the subject matter of the present disclosure. In the following, descriptions are made of only the parts necessary for understanding the operations in accordance with various embodiments of the present disclosure and are not made of the other parts to avoid obscuring the subject matter of the present disclosure.

A brief description is made of the difference between OFDM and FBMC schemes with reference to the accompanying drawings.

Figure 1A:
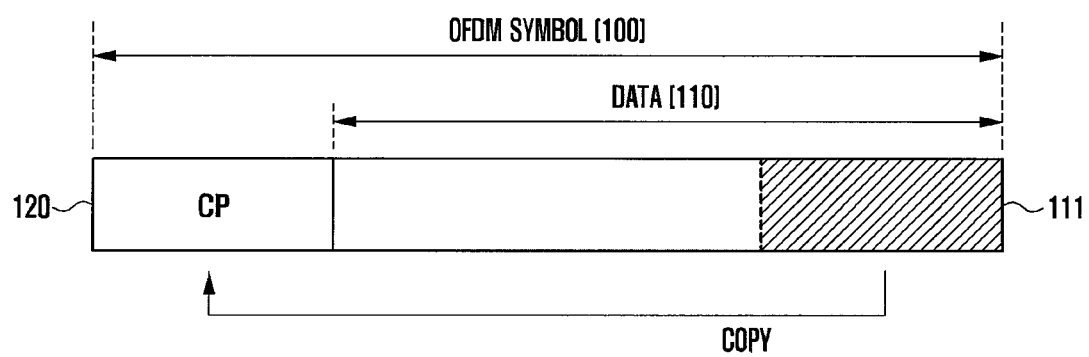
FIG. 1A is a diagram illustrating an exemplary structure of a symbol transmitted in an OFDM-based wireless communication system.
Figure 1B:
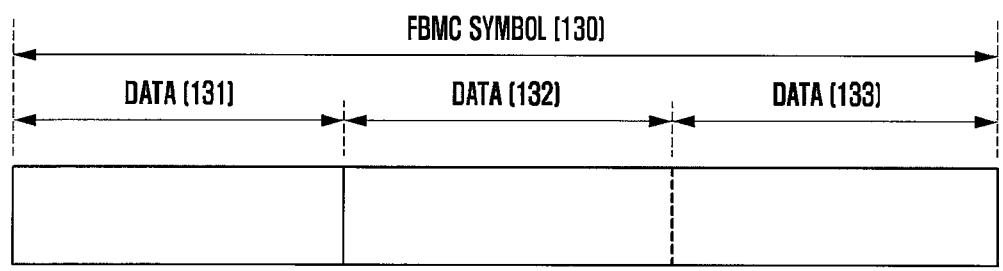
FIG. 1B is a diagram illustrating an exemplary structure of a symbol transmitted in a FBMC-based wireless communication system.

FIG. 1A is a diagram illustrating an exemplary structure of a symbol transmitted in an OFDM-based wireless communication system, and FIG. 1B is a diagram illustrating an exemplary structure of a symbol transmitted in a FBMC-based wireless communication system.

Referring to FIG. 1A, an OFDM symbol 100 consists of Cyclic Prefix (CP) 120 and a data symbol 110. The CP 120 is copied from the end of the symbol data as denoted by reference number 111. The CP 120 has a length long enough to remove Inter-Symbol Interference (ISI) caused by multipath propagation. Accordingly, the length of the CP 120 may be determined in consideration of the cell size and multi-path time delay.

FIG. 1B shows the FBMC symbols with the overlapping factor (L) of 3. Referring to FIG. 1B, an FBMC symbol 130 consists of three data symbols 131, 132, and 133 in such a way to repeat the OFDM symbol 130. The data symbols 131, 132, and 133 constituting one FBMC symbol may be configured with the same data as the data 110 of FIG. 1A. That is, the data symbols 131, 132, and 133 included in the FBMC symbol 130 can be configured in such a way to repeat the same data as the data 110 of FIG. 1A as many times as the overlapping factor (L).

However, the FBMC symbol 130 is reconfigured into a format different from the OFDM symbol by applying a filter to the data symbols 131, 132, and 133 to generate the FBMC symbol. Accordingly, the data symbol 110 of the OFDM symbol and each of the data symbols 131, 132, and 133 constituting the FBMC symbol have a different format from each other.

As described above, it can be shown that the FBMC symbol-based communication is inferior to the OFDM symbol-based communication in data rate because the length of the CP is equal to or less than the data symbol in the OFDM symbol. Assuming that the length of the data symbol is k in the OFDM symbol 100, the length of the OFDM symbol is equal to or less than 2 k.

However, since the overlapping factor (L) of the FBMC symbol 130 which indicates the number of repetitions of data is set to a value equal to or greater than 2 (e.g., 2, 3, 4, 5, etc.), the total length of the FBMC symbol is identical to the sum of the corresponding number of CP-less OFDM symbols. In the following description, the term "FBMC symbol" denotes the CP-less OFDM symbol. Accordingly, the total length of the FBMC symbol becomes L×k. Consequently, if only one symbol is transmitted, the FBMC transmission is inferior to the OFDM transmission in data transmission efficiency.

In order to protect against the loss in the case of transmitting only one symbol, the FBMC system adopts a method of transmitting a plurality of symbols in an overlapped manner. A description thereof is described with reference to the accompanying drawings.

Figure 2A:
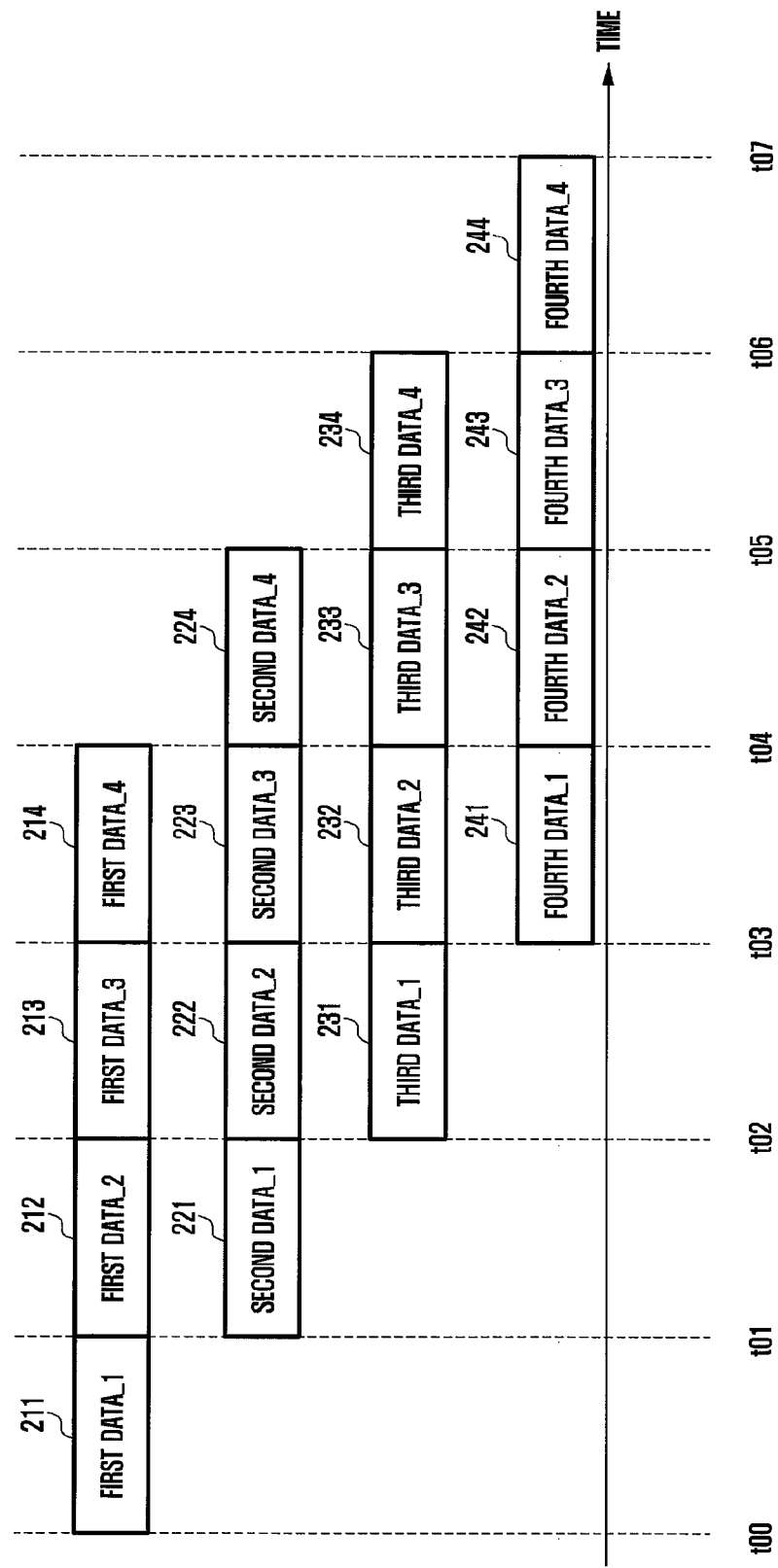
FIG. 2A is a timing diagram illustrating a scheme of transmitting different data successively with the overlapping factor (L) of 4 in an FBMC system according to an embodiment of the present disclosure.

FIG. 2A is a timing diagram illustrating a scheme of transmitting different data successively with the overlapping factor (L) of 4 in an FBMC system according to an embodiment of the present disclosure.

In the case that the overlapping factor (L) is 4, the data are transmitted in an overlapped manner such that different data are transmitted simultaneously, which is unlike the case of FIG. 1B in which the same data are transmitted sequentially in the time domain. As shown in FIG. 2A, the first to fourth data are transmitted at a regular time interval such that the real data being transmitted in different time durations are distinct from each other.

That is, the first data_1 211, first data_2 212, first data_3 213, and first data_4 214 are formed by repeating the first data as many times as the overlapping factor and multiplying the repeated results by a filter. Likewise, the second data_1 221, second data_2 222, second data_3 223, and second data_4 224 are formed by repeating the second data as many times as the overlapping factor and multiplying the repeated results by a filter. Also, the third data_1 231, third data_2 232, third data_3 233, and the third data_3 234 are formed by repeating the third data as many times as the overlapping factor and multiplying the repeated results by a filter. Finally, the fourth data_1 241, fourth data_2 242, fourth data_3 243, and fourth data_4 244 are formed by repeating the fourth data as many times as the overlapping factor and multiplying the repeated results by a filter.

A description is made hereinafter of the transmission of the data modified by the overlapping factor.

The first to fourth data each have an FBMC symbol size (transmission time) as described above. In FIG. 2A, the duration between t00 and t01, duration between t01 and t02, duration between t02 and t03, duration between t03 and t04, duration between t04 and t05, duration between t05 and t06, and duration between t06 and t07 are all equal to the FBMC transmission time.

The first data are repeated four times and the first copy 211 of the first data which has passed an FBMC filter is transmitted in the duration between t00 and t01. Likewise, the second copy 212 of the first data is transmitted in the duration between t01 and t02. At this time, the first copy 221 of the second data which has passed the FBMC filter is transmitted along with the second copy 212 of the first data. This means that the sum of the second copy 212 of the first data and the first copy 221 of the second data is transmitted through the air.

The third copy 213 of the first data which has passed the FBMC filter is transmitted in the duration between t02 and t03. At this time, the second copy 222 of the second data which has passed the FBMC filter and the first copy 231 of the third data which has passed the FBMC filter are transmitted along with the third copy 213 of the first data. This means that the sum of the third copy 213 of the first data, the second copy 222 of the second data, and the first copy 231 of the third data is transmitted through the air.

Likewise, the fourth copy 214 of the first data which has passed the FBMC filter is transmitted in the duration between t03 and t04. At this time, the third copy 223 of the second data which has passed the FBMC filter, the second copy 232 of the third data which has passed the FBMC filter, and the first copy 241 of the fourth data are transmitted along with the fourth copy 214 of the first data. This means that the sum of the fourth copy 214 of the first data, the third copy 223 of the second data, the second copy of the third data, and the first copy 241 of the fourth data is transmitted through the air.

Assuming that the fifth data, the sixth data, and so on follow the fourth data infinitely, the copies of the respective data are transmitted as overlapped with other data copies like the fourth copy 214 of the first data; and, if the overlapping factor (L) is 4, up to four different data copies can be overlapped. Consequently, from the view of the receiver receiving specific data, "overlapping factor–1" data appears to be received in addition to the data addressed to the receiver.

That is, if the data are transmitted as shown in FIG. 2A, an IFFT block of the data is repeated as many times as k because of the oversampling effect and filtered by multiplying by a prototype filter with a length of L so as to form one FBMC symbol. Since the FBMC symbols are transmitted through an overlap and sum operation as shown in FIG. 2A, compared with the legacy OFDM it is possible to achieve gains in long term spectral efficiency as great as the length of the CP. However, with short term data transmission, the spectral efficiency drops in comparison with the legacy OFDM because the data transmission amount per unit time is small.

Figure 2B:
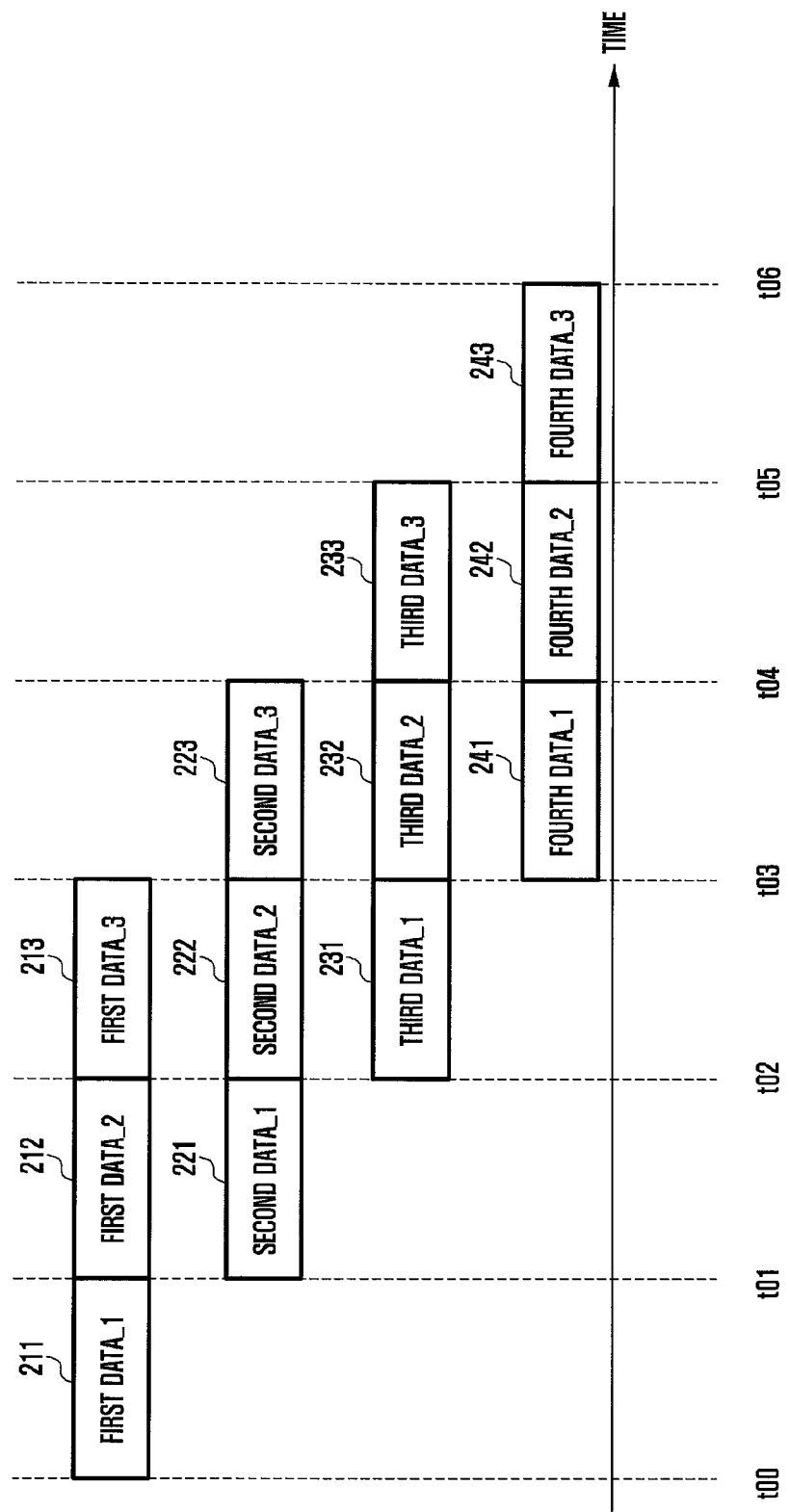
FIG. 2B is a timing diagram illustrating a scheme of transmitting different data successively with the overlapping factor (L) of 3 in an FBMC system according to an embodiment of the present disclosure.

FIG. 2B is a timing diagram illustrating a scheme of transmitting different data successively with the overlapping factor (L) of 3 in an FBMC system according to an embodiment of the present disclosure.

In the case that the overlapping factor (L) is 3, the data are transmitted in an overlapped manner such that different data are transmitted simultaneously, which is unlike the case of FIG. 1B in which the same data are transmitted sequentially in the time domain. As shown in FIG. 2B, the first to fourth data are transmitted at a regular time interval such that the real data being transmitted in different time durations are distinct from each other. It should be noted that the filters used in FIGS. 2A and 2B differ from each other; thus, the data are transmitted in different formats too.

That is, the first data_1 211, first data_2 212, and first data_3 213 are formed by repeating the first data as many times as the overlapping factor and multiplying the repeated results by a filter. Likewise, the second data_1 221, second data_2 222, and second data_3 223 are formed by repeating the second data as many times as the overlapping factor and multiplying the repeated results by a filter. Also, the third data_1 231, third data_2 232, and third data_3 233 are formed by repeating the third data as many times as the overlapping factor and multiplying the repeated results by a filter. Finally, the fourth data_1 241, fourth data_2 242, and fourth data_3 243 are formed by repeating the fourth data as many times as the overlapping factor and multiplying the repeated results by a filter.

The first to fourth data each have an FBMC symbol size (transmission time) as described above. In FIG. 2B, the duration between t00 and t01, duration between t01 and t02, duration between t02 and t03, duration between t03 and t04, duration between t04 and t05, and duration between t05 and t06 are all equal to the FBMC transmission time.

The first data are repeated three times and the first copy 211 of the first data which has passed an FBMC filter is transmitted in the duration between t00 and t01. Likewise, the second copy 212 of the first data is transmitted in the duration between t01 and t02. At this time, the first copy 221 of the second data which has passed the FBMC filter is transmitted along with the second copy 212 of the first data. This means that the sum of the second copy 212 of the first data and the first copy 221 of the second data is transmitted through the air.

The third copy 213 of the first data which has passed the FBMC filter is transmitted in the duration between t02 and t03. At this time, the second copy 222 of the second data which has passed the FBMC filter and the first copy 231 of the third data which has passed the FBMC filter are transmitted along with the third copy 213 of the first data. This means that the sum of the third copy 213 of the first data, the second copy 222 of the second data, and the first copy 231 of the third data is transmitted through the air.

Assuming that the fifth data, the sixth data, and so on follow the fourth data infinitely, the copies of the respective data are transmitted as overlapped with other data copies; and, if the overlapping factor (L) is 3, up to three different data copies can be overlapped. Consequently, from the view of the receiver receiving specific data, "overlapping factor–1" data appears to be received in addition to the data addressed to the receiver.

However, since the data transmission cannot be performed infinitely, there is always transient duration. In the FBMC system, the beginning part of transmission is called transient duration. For example, transient duration corresponds to the duration between t00 and t03 in FIG. 2A and the duration between t00 and t02 in FIG. 2B. Transient duration can occur at the end part of the data transmission as well as at the beginning part, and these two transient durations are referred to as "pre-transient duration" and "post-transient duration" respectively.

On the basis of the above description, it can be inferred that transient duration is longer as the overlapping factor increases. From the viewpoint of the receiver, it takes a longer time for data receipt to be completed as the overlapping factor increases.

In the FBMC-based wireless communication system as described above, if short burst traffic occurs frequently, the burden caused by the increase of transmission time degrades the transmission efficiency. The present disclosure provides a method and apparatus for improving data transmission efficiency in a short burst data traffic environment.

Figure 3A:
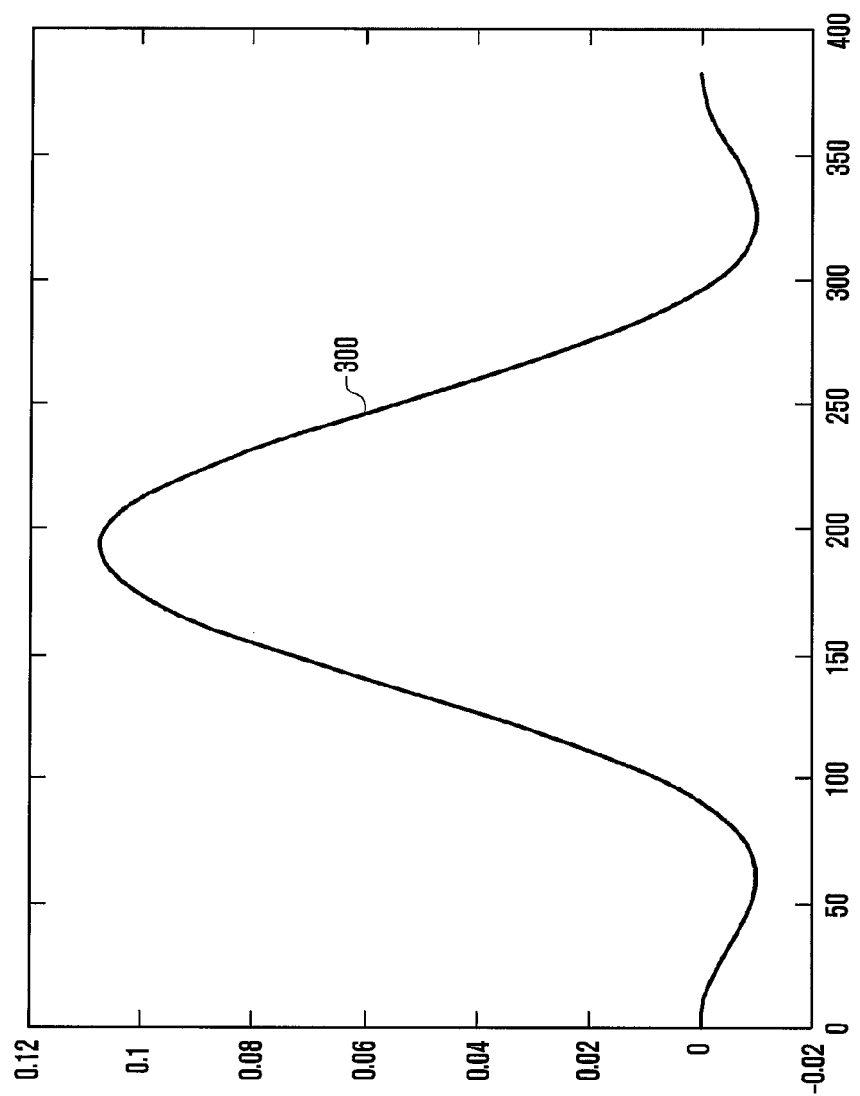
FIG. 3A is a diagram illustrating a graph showing the characteristics of a PHYDYAS filter used widely in the FBMC system.

FIG. 3A is a diagram illustrating a graph showing the characteristics of a PHYDYAS filter used widely in the FBMC system.

In the FBMC system, the data are typically modified by applying a filter having the characteristic in the form shown in FIG. 3A to the data repeated as many times as the overlapping factor. Referring to the characteristic graph 300 of the filter as shown in FIG. 3A, most of the energy is concentrated at the center and converged to 0 (zero) as it goes toward the edges.

That is, as exemplified in FIG. 1B, the data 131, 132, and 133 repeated three times are multiplied by the PHYDYAS filter. In this way, the FBMC symbol is generated as shown in FIG. 2A or 2b according to the overlapping factor. A description thereof is made hereinafter in detail with reference to the accompanying drawings.

FIG. 3B is a diagram illustrating how to generate an FBMC symbol by applying a PHYDYAS filter to the overlapped data in an FBMC system with the overlapping factor of 3.

In the case that the overlapping factor is 3, the data 310 are repeated three times and connected in series. The connected three copies 310a, 310b, and 310c of the first data are aligned in the order of occurrence. The connected three copies of the first data 310a, 310b, and 310c are multiplied by the PHYDYAS filter having the characteristic of FIG. 3A to generate the first data_1 211, first data_2 212, and first data_3 213 as shown in FIG. 2B.

In the embodiment of FIG. 3B where the overlapping factor is 3, most of the energy is concentrated on the second copy 310a of the first data with almost zero energy on the first and third copies 310a and 310c of the first data.

Accordingly, it can be possible to configure such that only the second copy 310b on which the energy is concentrated is transmitted and exclude the first and third copies 310a and 310c on which almost zero energy is distributed. This can be achieved by selecting a point 320 where the energy curve reaches its maximum peak and transmitting the data corresponding to a period consisting of a part right before the energy peak point as denoted by reference number 330a and a part right after the energy peak point as denoted by reference number 330b. At this time, the data length should be secured to transmit the whole data. In order to achieve this, the part 330a corresponding to half of the data length in the energy domain preceding the point 320 and the part 330b corresponding to half of the data length in the energy domain following the point 320 are selected to form one symbol.

In the following description, an operation of forming one symbol with the data corresponding to half the data length right before the energy peak point and the data corresponding to half the data length right after the energy peak point of the prototype filter to be applied to the data repeated with the size corresponding to the overlapping factor is called "transmission data period determination".

In the case of selecting the data in the duration with a high energy distribution ratio, most of the energy for real transmission is concentrated on the corresponding symbol; thus, energy loss may not be significant.

Figure 3C:
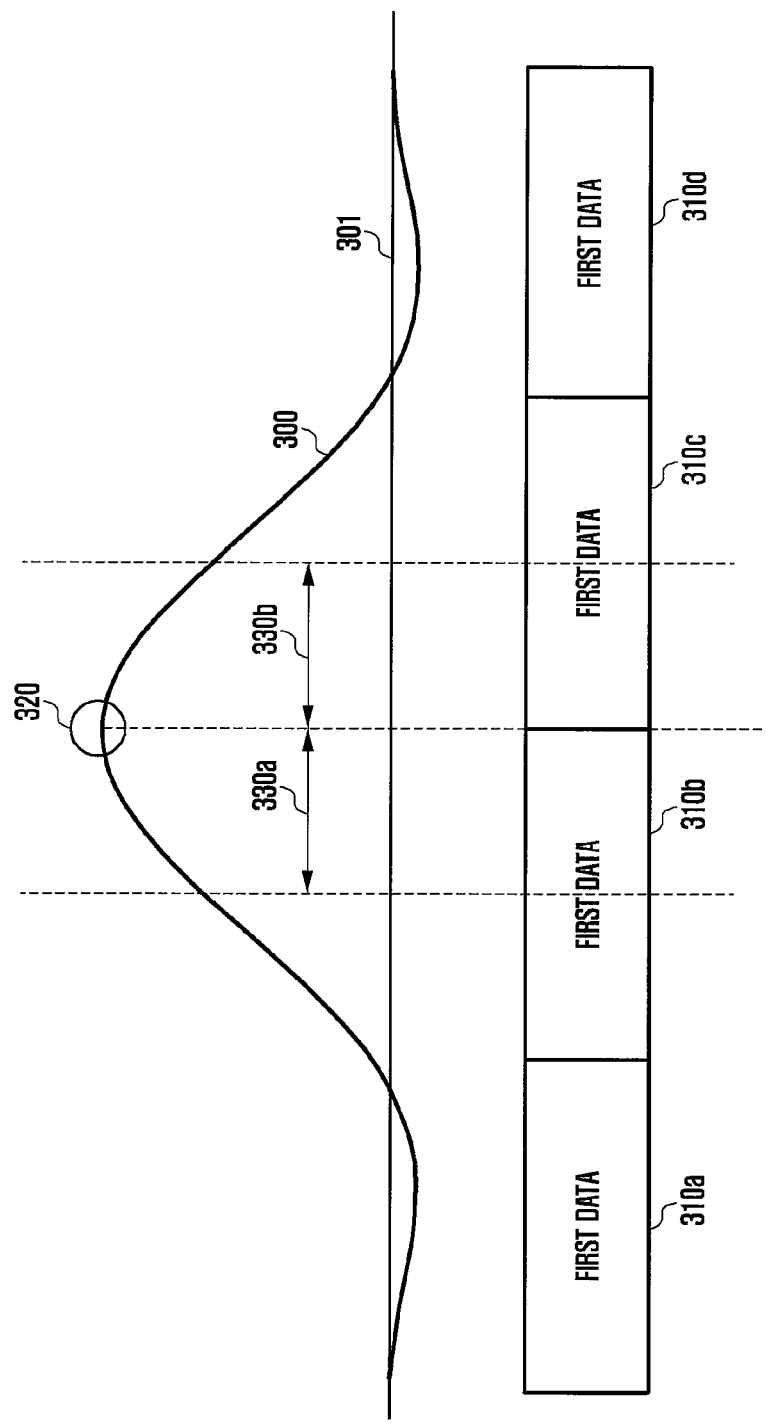
FIG. 3C is a diagram illustrating how to generate an FBMC symbol by applying a PHYDYAS filter to the overlapped data in an FBMC system with the overlapping factor of 4.

FIG. 3C is a diagram illustrating how to generate an FBMC symbol by applying a PHYDYAS filter to the overlapped data in an FBMC system with the overlapping factor of 4.

In the case that the overlapping factor is 4, the first data are repeated four times, and most of the energy is concentrated on the center according to the characteristic of the PHYDYAS filter with almost zero energy on the first repeated data 310a and the last repeated data 310d. Unlike the case where the overlapping factor is 3, the last half of the second copy 310b and the first half of the third copy 310c constitute a whole data symbol at the center.

Accordingly, it can be possible to configure such that the first and fourth copies 310a and 310d of the first data and the first half of the second copy 310b and the last copy of the third copy 310c on which almost zero energy is distributed are not transmitted. That is, it can be possible to configure such that the last half of the second copy 310b and the first half of the third copy 310c of the first data form the whole data to be transmitted.

In this case, it is possible to form the whole data as described above. This can be achieved by selecting a point 320 where the energy curve reaches its maximum peak and transmitting the data corresponding to a period consisted of a part right before the energy peak point as denoted by reference number 330a and a part right after the energy peak point as denoted by reference number 330b. At this time, the data length should be fixed to transmit the whole data. In order to achieve this, the part 330a corresponding to half of the data length in the energy domain preceding the point 320 and the part 330b corresponding to half of the data length in the energy domain following the point 320 are selected to form one symbol.

In the case of selecting the data in the duration with a high energy distribution ratio, most of the energy for real transmission is concentrated on the corresponding symbol; thus, energy loss may not be significant.

In the methods of the embodiments of FIGS. 3B and 3C, only one IFFT block is considered because no oversampling is performed. Since the legacy prototype filter having a length S is inferior in time confinement, the energy is concentrated to a part with a length of M in the total length of S. In order to accomplish a non-overlap and sum-based FBMC transmission, a filter having a length of M is used. Here, M denotes a data period length or one data length, i.e. a length equal to the FBMC symbol length.

If the overlapping factor of the legacy overlap and sum-based FBMC is set to an even number, the IFFT value multiplied by the filter coefficient with the length of M has a shape as cyclic-shifted as much as M/2 in the non-overlap and sum-based structure. In the non-overlap and sum-based structure, the offset symbols generated due to the use of OQAM are overlapped while other FBMC symbols are transmitted without being overlapped.

However, in the case of transmitting the data symbols as described with reference to FIGS. 3B and 3C, the Power Spectral Density (PSD) degrades; thus, there is a need to compensate for the PSD degradation. A description is made of the PSD compensation hereinafter with reference to FIGS. 3D and 3E.

Figure 3D:
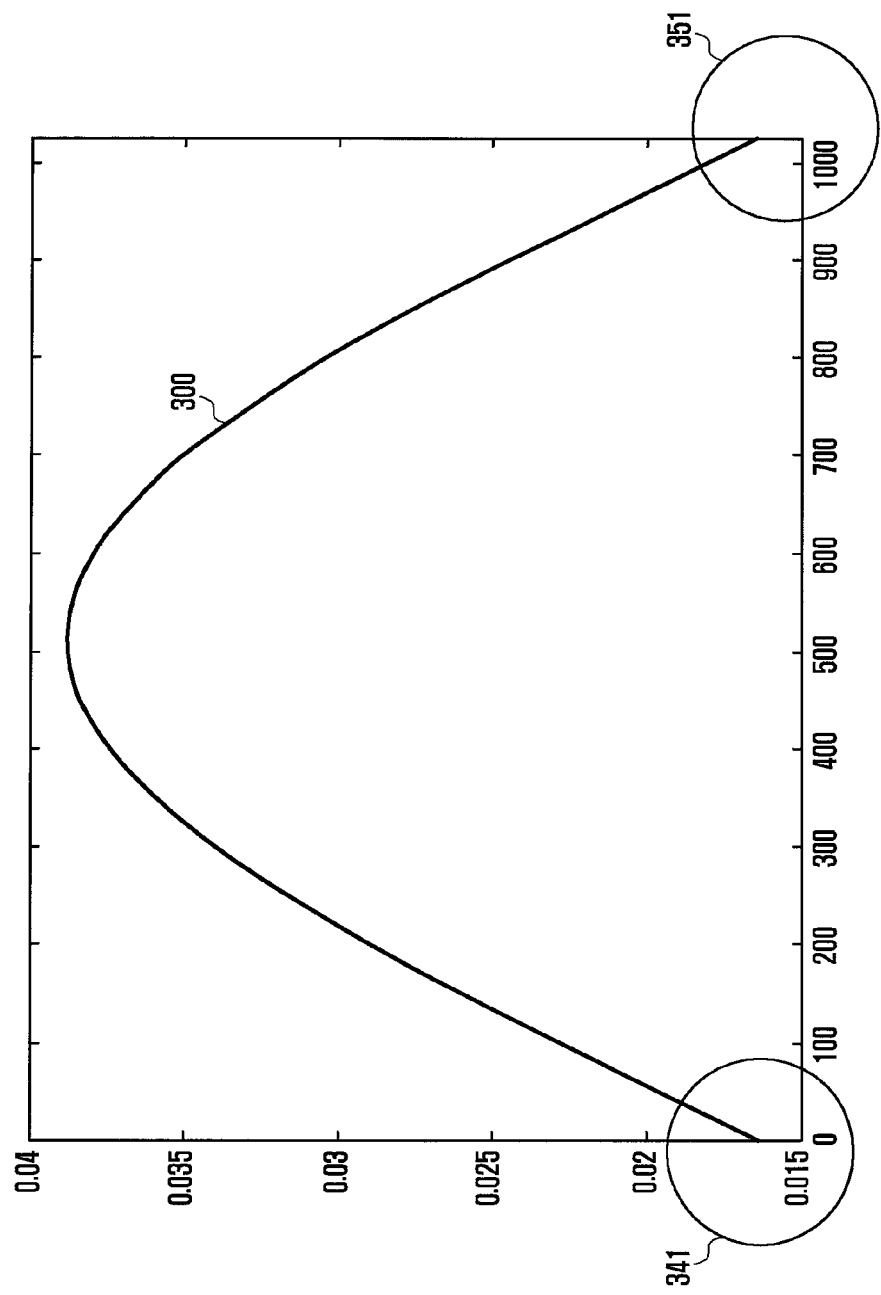
FIG. 3D is a diagram illustrating an energy characteristic graph of a prototype filter in the case of transmitting the FBMC symbol in part according to an embodiment of the present disclosure.
Figure 3E:
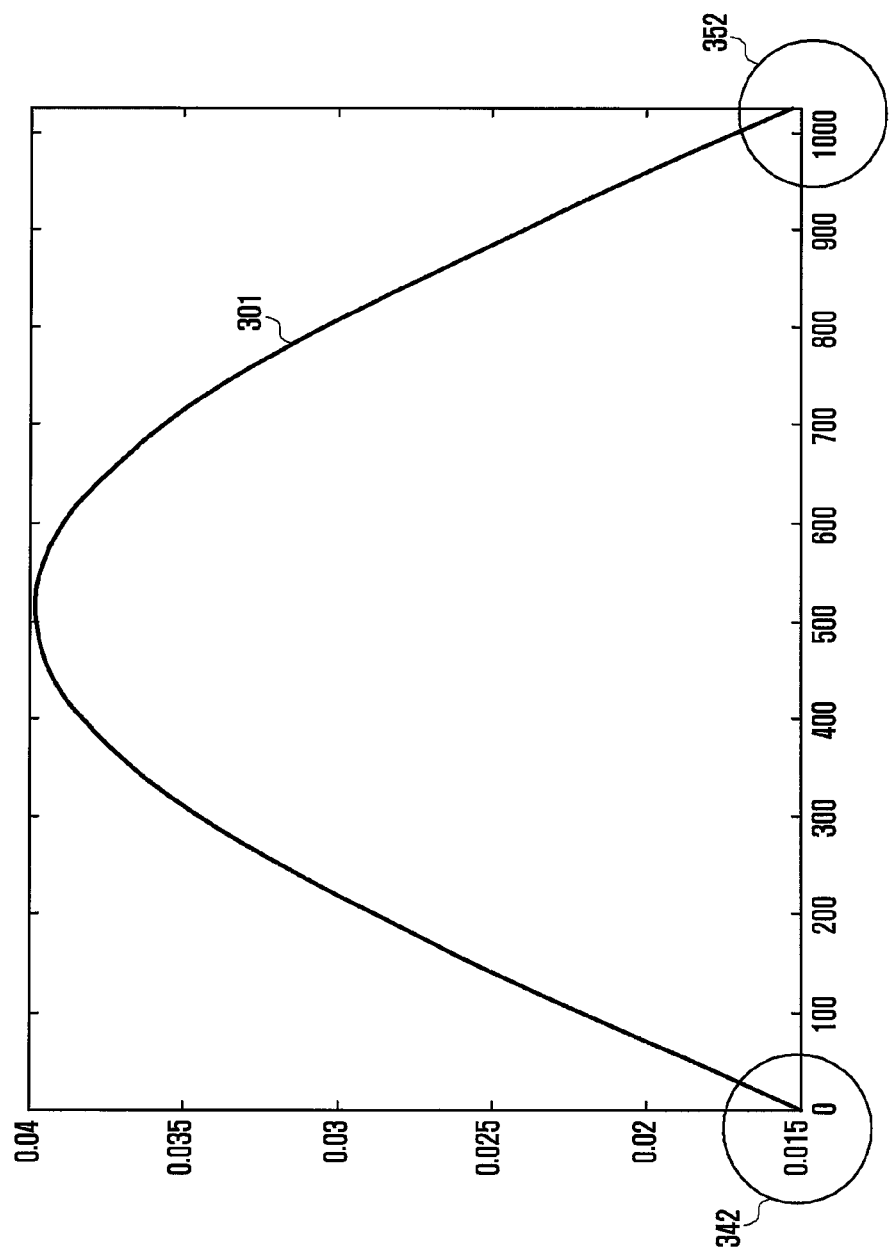
FIG. 3E is a diagram illustrating an energy characteristic graph of a modified prototype filter in the case of transmitting the FBMC symbol in part according to an embodiment of the present disclosure.

FIG. 3D is a diagram illustrating an energy characteristic graph of a prototype filter in the case of transmitting the FBMC symbol in part according to an embodiment of the present disclosure, and FIG. 3E is a diagram illustrating an energy characteristic graph of a modified prototype filter in the case of transmitting the FBMC symbol in part according to an embodiment of the present disclosure.

Referring to FIG. 3D, if the data are transmitted as shown in FIG. 3B or 3C, the energy characteristic curve 300 of the PHYDYAS filter as a prototype filter shows a non-zero level at both the end parts of the data as denoted by reference numbers 341 and 351. If the energy characteristic of the prototype filter shows a non-zero level at the start and end parts of the data, the PSD is likely to drop significantly.

In the present disclosure, the energy distribution characteristic of the prototype filter is adjusted as shown in the energy distribution curve 301 of FIG. 3E. That is, the energy characteristic is adjusted such that the energy level at the start and end parts of the data becomes 0 as denoted by reference numbers 342 and 352. At this time, it is preferable for change in the energy level from the peak energy level to be smooth and not abrupt.

In the present disclosure, a filter for changing the energy characteristic of the prototype filter to adjust the energy level at the start and end parts of the data to 0 is called "shortened compensation filter". In more detail, the shortened compensation filter of the present disclosure has to have the following characteristics. First, its energy characteristic curve has an energy peak point as described above. Second, two half parts divided along the link passing through the energy peak point are equal in size and an energy characteristic region corresponding to one data length is extracted. Third, it adjusts the energy characteristic curve of the extracted energy characteristic region to change smoothly such that the energy level at the start and end parts of the data becomes 0. The filter designed to have the above characteristics is called "shorted compensation filter" in the present disclosure.

The above described compensation process improves the time confinement as well as the PSD performance of the filter so as to show a superior performance in the multi-path delay environment.

In the system to which such a shortened compensation filter is applied according to the present disclosure, it is possible to reduce the delay in comparison with the symbol transmission in the legacy FBMC scheme especially when transmitting small data occurring sporadically with good PSD characteristic.

Figure 4A:
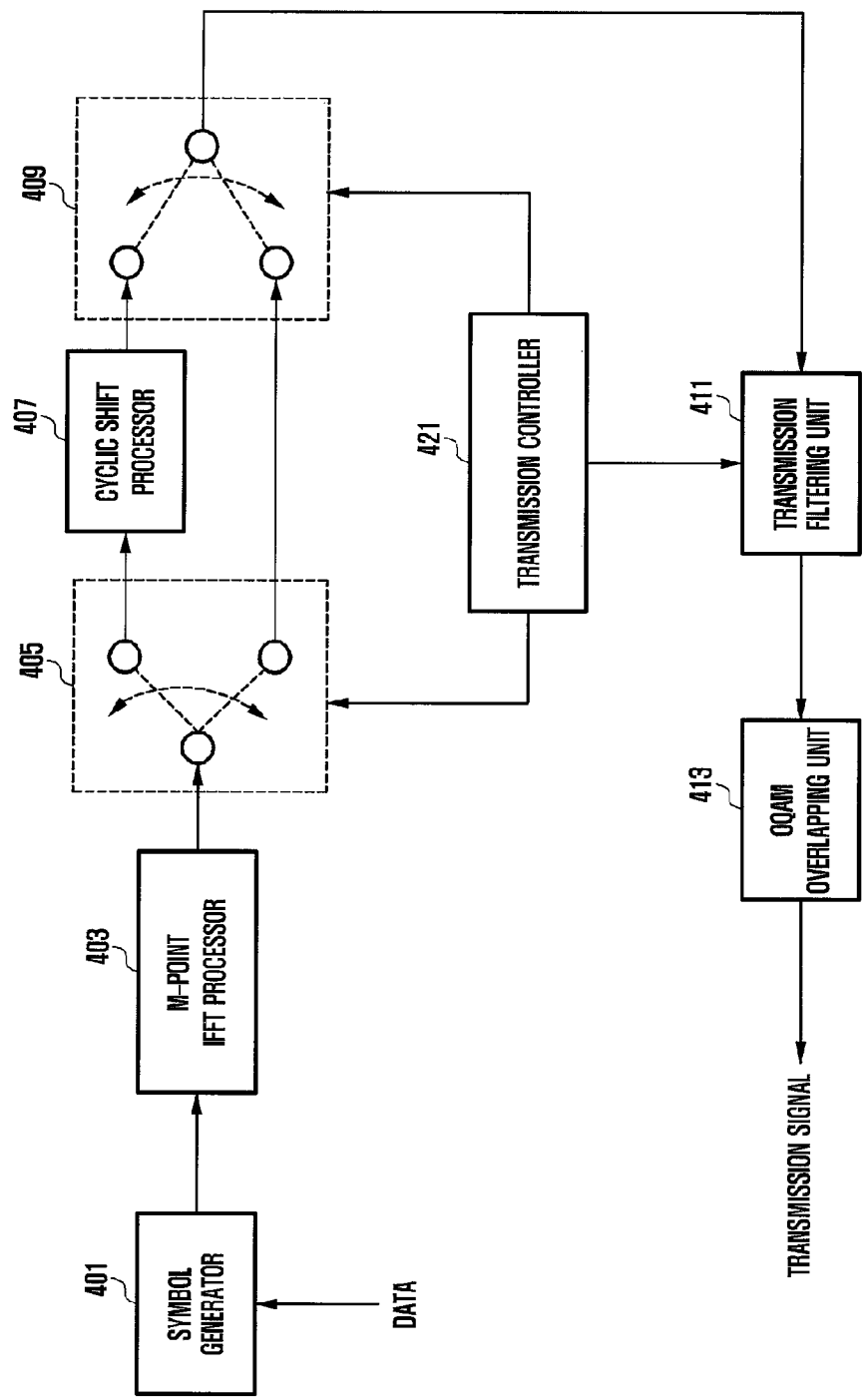
FIG. 4A is a block diagram illustrating a configuration of a transmission apparatus to which a shortened compensation filter is applied according to an embodiment of the present disclosure.

FIG. 4A is a block diagram illustrating a configuration of a transmission apparatus to which a shortened compensation filter is applied according to an embodiment of the present disclosure.

Referring to FIG. 4A, if data to be transmitted is input to a symbol generator 401, the symbol generator 401 processes the data to generate an FBMC symbol. At this time, the symbol generator 401 generates the same data repeatedly as many times as an overlapping factor in a normal data transmission mode, and it generates a single data without repeating when being controlled to transmit the data one time or in a single data duration according to the present disclosure.

The data output from the symbol generator 401 is input to an M-point IFFT processor 403. In the case of transmitting the data repeated as many times as the overlapping factor or transmitting data in a single data duration according to the present disclosure, the M-point IFFT processor 403 performs IFFT on the input data and outputs transformed data to a first transmission switch 405.

The first transmission switch 405 can switch the output of the M-point IFFT processor 403 to a cyclic shift processor 407 or bypass the cyclic shift processor 407. That is, the first and second transmission switches 405 and 409 perform switching operations to output the signal from the M-point IFFT processor 403 to a transmission filtering unit 411 with or without passing through the cyclic shift processor 407. If the symbol is generated according to an embodiment of the present disclosure and the overlapping factor is an even number, the data is input in the state where the two halves of the data are interchanged in position as shown in FIG. 3C. In the case that the data are input in the state where the halves are exchanged in their positions, the transmission apparatus has to rearrange the order in advance. In the exemplary case of FIG. 3C, the last half of the second copy 310b of the first data and the first half of the third copy 310c of the first data are combined into a single data block. Accordingly, the cyclic shift processor 407 performs cyclic shifting such that the first half of the third copy 310c of the first data and the last half of the second copy 310b of the first data are combined in such order.

In the case of not transmitting only one data block or transmitting data blocks as many as the overlapping factor, it can be possible to configure such that the cyclic shift processor 407 is bypassed. That is, the first and second transmission switches 405 and 409 are configured to change the order of the data when the overlapping factor is an even number according to the present disclosure.

The data output from the second transmission switch 409 is input to a transmission filter 411. The transmission filter unit 411 can apply a prototype filter used in the FBMC system or a shortened compensation filter proposed in the present disclosure. In the case of transmitting normal data under the control of a transmission controller 421, the transmission filter unit 411 applies the prototype filter to output the data. The prototype filter has the characteristic as shown in FIG. 3A. However, it is also possible to apply a filter having different characteristics. It is noted that the characteristic of the prototype filter can be determined according to the agreement made in the system. The transmission filter unit 411 can apply the shortened compensation filter proposed in the present disclosure under the control of the transmission controller 421. The shortened compensation filter can have the characteristic as shown in FIG. 3E.

The FBMC symbols filtered by the transmission filter unit 411 are overlapped according to the OQAM characteristic at an OQAM overlapping unit 413 so as to be output as a transmission signal.

The transmission controller 421 controls the overall operation related to the data transmission of the transmission apparatus of the present disclosure; and, particularly when a single data block is transmitted according to the present disclosure, it can control symbol generation, IFFT processing, switching, cyclic shift, filter application, and OQAM overlapping operations. Although it is shown that the transmission controller 421 generates control signals to the parts specific to the present disclosure in FIG. 4A, it should be noted that all of the function blocks can operate according to the control signals generated by the transmission controller 421.

Figure 4B:
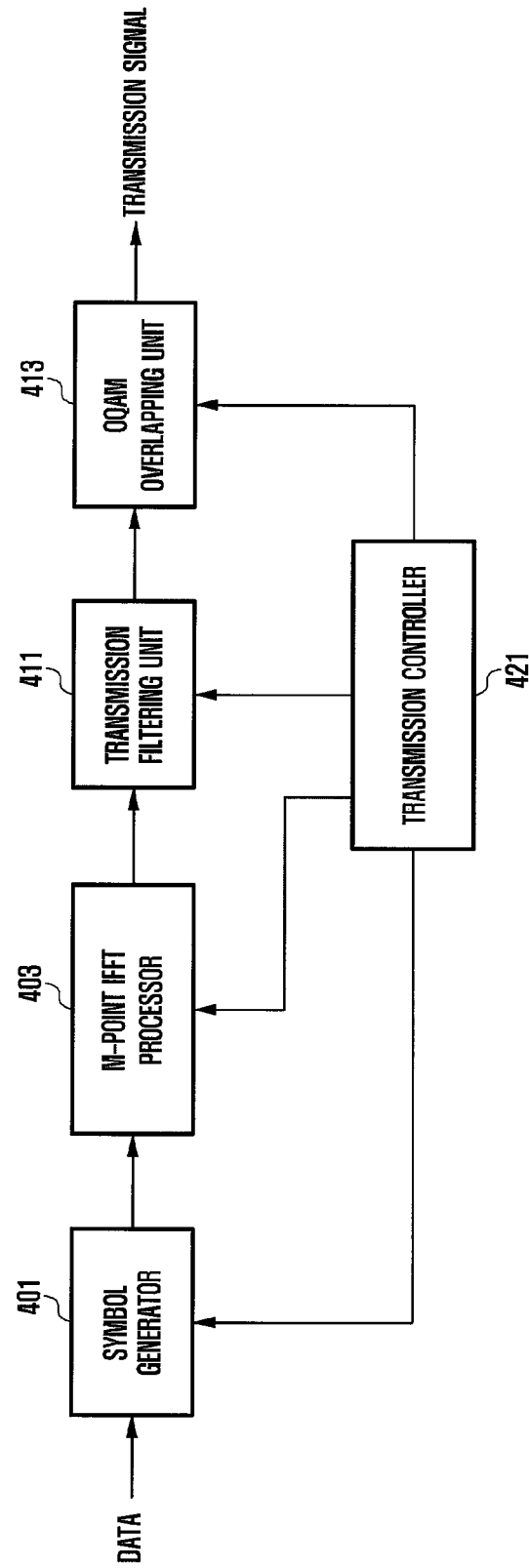
FIG. 4B is a block diagram illustrating a configuration of a transmission apparatus to which a shortened compensation filter is applied according to another embodiment of the present disclosure.

FIG. 4B is a block diagram illustrating a configuration of a transmission apparatus to which a shortened compensation filter is applied according to another embodiment of the present disclosure.

If the data to be transmitted is input to a symbol generator 401, the symbol generator 401 processes the data to generate an FBMC symbol. At this time, the symbol generator 401 generates the same data repeatedly as many times as an overlapping factor in a normal data transmission mode, but it generates a single data without repeating when being controlled to transmit the data one time or in a single data duration according to the present disclosure.

The data output from the symbol generator 401 is input to an M-point IFFT processor 403. In the case of transmitting the data repeated as many times as the overlapping factor or transmitting data in a single data duration according to the present disclosure, the M-point IFFT processor 403 performs IFFT on the input data and outputs transformed data to a transmission filter unit 411. The transmission filter unit 411 can apply a prototype filter used in the FBMC system or a shortened compensation filter proposed in the present disclosure. In the case of transmitting normal data under the control of a transmission controller 421, the transmission filter unit 411 applies the prototype filter to output the data. The prototype filter has the characteristic as shown in FIG.

3A. It is noted that the characteristic of the prototype filter can be determined according to the agreement made in the system. The transmission filter unit 411 can apply the shortened compensation filter proposed in the present disclosure under the control of the transmission controller 421. The shortened compensation filter can have the characteristic as shown in FIG. 3E. The FBMC symbols filtered by the transmission filter unit 411 are overlapped according to the OQAM characteristic at an OQAM overlapping unit 413 so as to be output as a transmission signal.

The transmission controller 421 controls the overall operation related to the data transmission of the transmission apparatus of the present disclosure; and, particularly when a single data block is transmitted according to the present disclosure, it can control symbol generation, IFFT processing, filter application, and OQAM overlapping operations.

Unlike the transmission apparatus of FIG. 4A, the transmission apparatus of FIG. 4B does not include the transmission switches 405 and 408 and the cyclic shift processor 407. The transmission switches 405 and 408 and the cyclic shift processor 407 are excluded in two cases as described hereinafter.

First, they are excluded when the overlapping factor (L) is an odd number. If the overlapping factor is 3, the single data block is output without shift of their halves as described with reference to FIG. 3B. Accordingly, in the case that the overlapping factor is an odd number, the transmission apparatus can be configured as shown in FIG. 4B.

Second, they are excluded when the cyclic shift operation is performed by a reception apparatus and not performed by the transmission apparatus. In this case, the reception apparatus performs the cyclic shift operation on behalf of the transmission apparatus. Descriptions are made of the case where the cyclic shift operation is performed by the transmission apparatus and the case where the cyclic shift operation is performed by the reception apparatus hereinafter with reference to the accompanying drawings.

Figure 5:
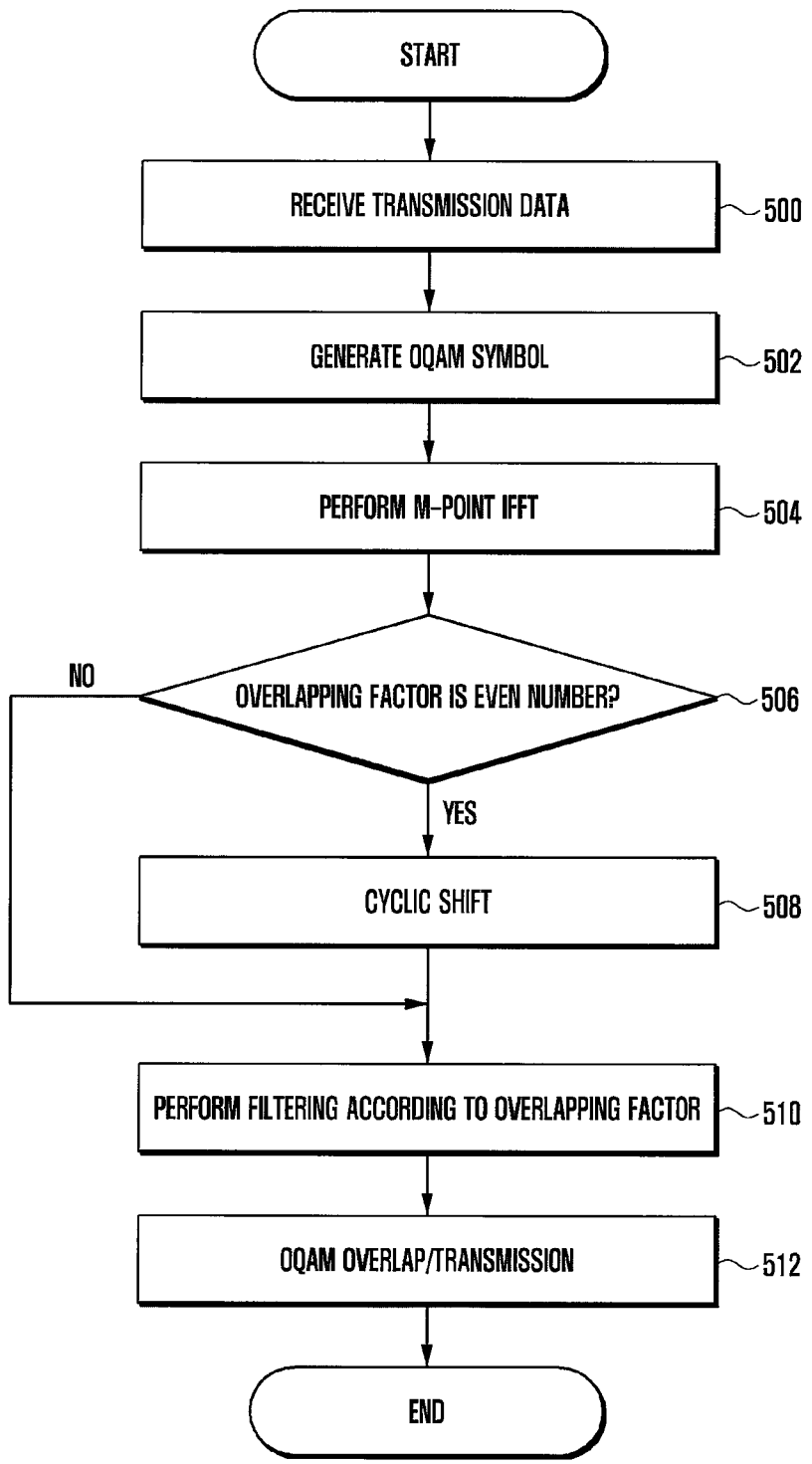
FIG. 5 is a flowchart illustrating a data generation and transmission procedure when the cyclic shift is performed by the transmission apparatus according to an embodiment of the present disclosure.

FIG. 5 is a flowchart illustrating a data generation and transmission procedure when the cyclic shift is performed by the transmission apparatus according to an embodiment of the present disclosure.

It should be noted that FIG. 5 is directed to the case where one data block is transmitted according to the present disclosure rather than to the case where the normal data are transmitted.

If the data to be transmitted is input at step 500, the symbol generator 401 generates an OQAM symbol at step 502. At this time, the symbol generator 401 repeats the data as many times as the overlapping factor (L) to generate data copies constituting the OQAM symbol and to output one of the copies. If the overlapping factor is an even number, the symbol generator 401 outputs a data copy consisting of two halves interchanged in position as shown in FIG. 3C; otherwise, if the overlapping factor is an odd number, the symbol generator 401 outputs a data copy as shown in FIG. 3B.

Afterward, the M-point IFFT processor 403 performs IFFT on the OQAM symbol at step 504. Then the transmission controller 521 determines whether the overlapping factor is an even number at step 506. The reason of determining whether the overlapping factor is an even number is to determine whether to control the first and second transmission switches 405 and 409 to pass the OQAM symbol through the cyclic shift processor 407.

If it is determined that the overlapping factor is an even number at step 506, the transmission controller 421 controls the first and second transmission switches 405 and 409 to connect to the M-point IFFT processor 403; thus, the cyclic shift processor 407 performs cyclic shift on the OQAM symbol at step 508. The cyclic shift operation is performed in such a way that the two halves of the data are exchanged in position.

Otherwise, if it is determined that the overlapping factor is not an even number at step 506, the transmission controller 421 controls the first and second transmission switches 405 and 409 to bypass the M-point IFFT processor 403. That is, if the overlapping factor is an even number at step 506, the procedure goes to step 508; and, if otherwise, goes directly to step 510.

If the data is input to the transmission filter unit 411 after being cyclically shifted or not, the control unit 421 controls to apply the shortened compensation filter generated according to the overlapping factor at step 510. That is, the transmission controller 421 controls the transmission filter unit 411 to apply the filter having the characteristic as shown in FIG. 3E.

The data filtered by applying the shortened compensation filter is input to the OQAM overlapping unit 413. The transmission controller 421 controls the OQAM overlapping unit 413 to overlap the input data in an OQAM scheme and output the overlapped data at step 512.

Figure 6:
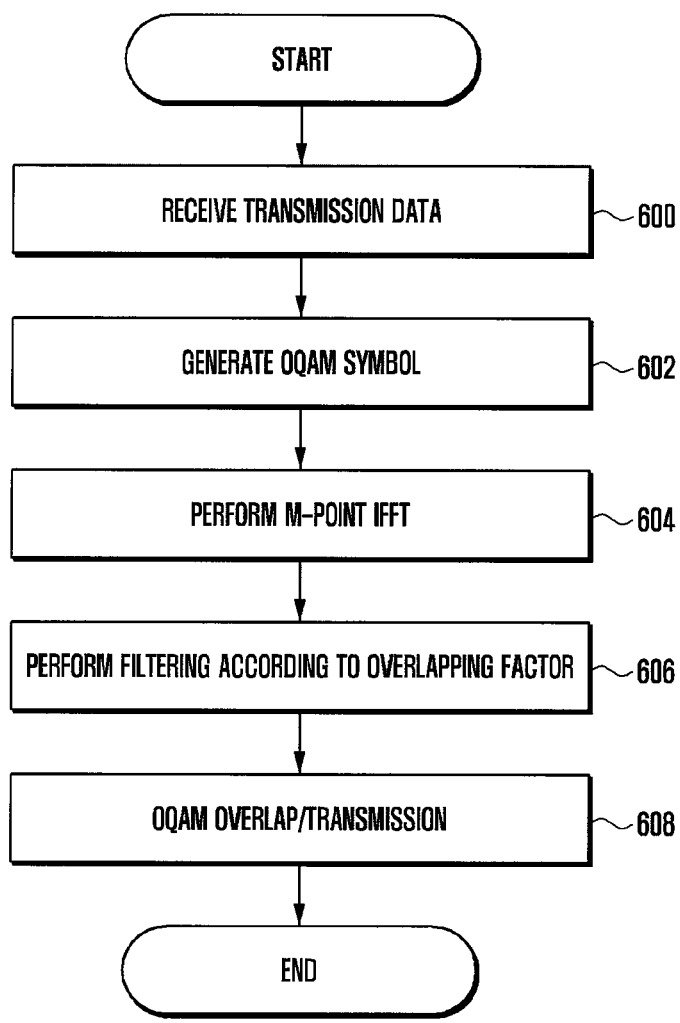
FIG. 6 is a flowchart illustrating a data generation and transmission procedure when the cyclic shift is performed by the transmission apparatus according to another embodiment of the present disclosure.

FIG. 6 is a flowchart illustrating a data generation and transmission procedure when the cyclic shift is performed by the transmission apparatus according to another embodiment of the present disclosure.

It should be noted that FIG. 6 is directed to the case where one data block is transmitted according to the present disclosure rather than the case where the normal data are transmitted.

If the data to be transmitted is input at step 600, the symbol generator 401 generates an OQAM symbol at step 602. At this time, the symbol generator 401 repeats the data as many times as the overlapping factor (L) to generate data copies constituting the OQAM symbol and to output one of the data copies. If the overlapping factor is an odd number, the symbol generator 401 outputs the data without modification because the data is not in the state where the two halves of the data are exchanged in position.

Afterward, the M-point IFFT processor 403 performs IFFT on the input OFDM symbol at step 604. At this time, since the overlapping factor is an odd number or the cyclic shift is not performed in the transmission apparatus, the output data is input to the transmission filter unit 411. Then the transmission controller 421 controls the transmission filter unit 411 to apply a shortened compensation filter generated according to the overlapping factor at step 608. That is, the transmission controller 421 controls the transmission filter unit 411 to apply the filter having the characteristic as shown in FIG. 3E.

The data filtered by applying the shortened compensation filter is input to the OQAM overlapping unit 413. The transmission control unit 421 controls the OQAM overlapping unit 413 to overlap the input data in the OQAM scheme and output the overlapped data at step 608.

Figure 7A:
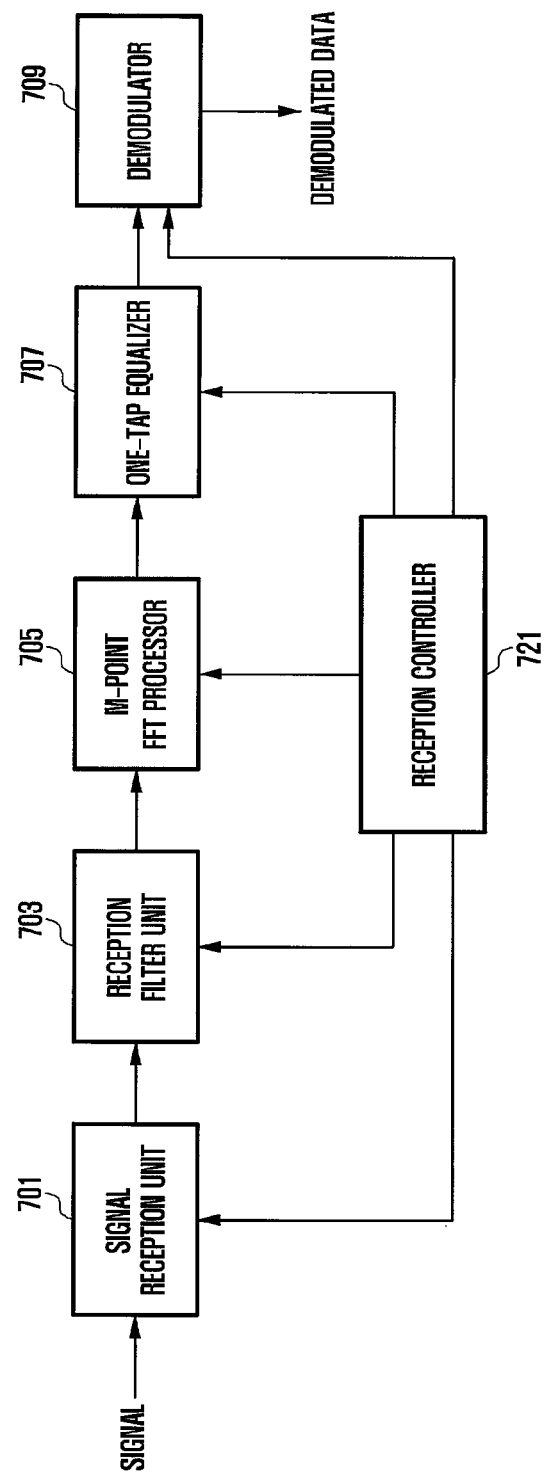
FIG. 7A is a block diagram illustrating a configuration of a reception apparatus for receiving at least one data block to which a shortened compensation filter is applied according to an embodiment of the present disclosure.

FIG. 7A is a block diagram illustrating a configuration of a reception apparatus for receiving at least one data block to which a shortened compensation filter is applied according to an embodiment of the present disclosure.

The reception apparatus of FIG. 7A can correspond to the transmission apparatus configured as shown in FIG. 4A. That is, the reception apparatus is configured as shown in FIG. 7A in order to receive the signal transmitted by the transmission apparatus in which the data are cyclically shifted according to the overlapping factor.

The single reception unit 701 can be a receiver for receiving a signal transmitted by the transmission apparatus under the control of a reception controller 721. Typically, it receives the signal on the Radio Frequency (RF) band allocated to the system and converts the RF band signal to a baseband signal or an intermediate frequency band signal. The signal reception unit 701 can receive the data as long as one FBMC symbol, as a signal of which the length corresponds to the overlapping factor agreed in the system, or through signaling. In the following, the description is directed to the case where a single data block is received and excluding the case of receiving the signal elongated as many times as the overlapping factor.

The reception filter unit 703 filters the received signal and outputs the filtered signal to an M-point FFT processor 705 under the control of the reception controller 721. At this time, a normal prototype filter for the FBMC system can be used. Afterward, the M-point FFT processor 705 performs FFT on the signal under the control of the reception controller 721. At this time, the FFT process is performed as long as a single data length.

The data output from the M-point FFT processor 705 is input to a one-tap equalizer 707. The one-tap equalizer 707 performs equalizing on the data as long as the single data length and outputs the equalized data to a demodulator 709. The demodulator 709 performs demodulation on the received data through a demodulation scheme corresponding to the modulation scheme used by the transmission apparatus.

The above described reception apparatus is configured to receive the signal carrying the data which have been shifted cyclically by the transmission apparatus. Accordingly, the reception apparatus of FIG. 7A has no function block for performing the cyclic shift. The case described above can be applied identically to the cases where the overlapping factor is an odd number or where the data as many times long as the overlapping factor are transmitted instead of the OQAM symbol equal in size to the single data length.

A description is made of the structure and operation of the reception apparatus configured for the case where the cyclic shift operation is not performed by the transmission apparatus.

Figure 7B:
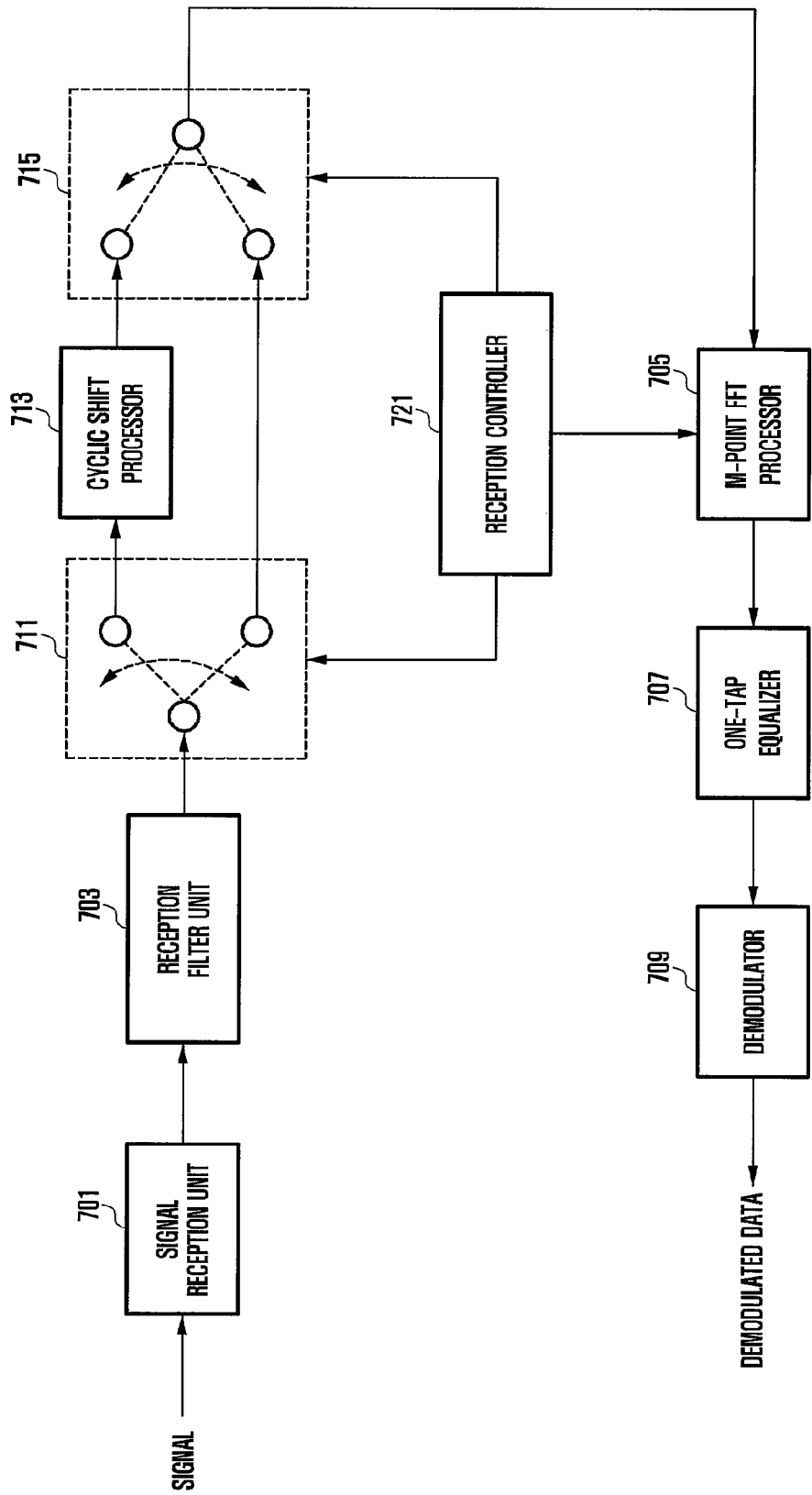
FIG. 7B is a block diagram illustrating a configuration of a reception apparatus for receiving at least one data block to which a shortened compensation filter is applied according to another embodiment of the present disclosure.

FIG. 7B is a block diagram illustrating a configuration of a reception apparatus for receiving at least one data block to which a shortened compensation filter is applied according to another embodiment of the present disclosure.

The single reception unit 701 can be a receiver for receiving a signal transmitted by the transmission apparatus under the control of a reception controller 721. Typically, it receives the signal on the RF band allocated to the system and converts the RF band signal to a baseband signal or an intermediate frequency band signal. The signal reception unit 701 can receive the data as long as one FBMC symbol, or as a signal of which the length corresponds to the overlapping factor agreed in the system, or through signaling. In the following, the description is directed to the case where a single data block is received and excluding the case of receiving the signal elongated as many times as the overlapping factor.

The reception filter unit 703 filters the received signal and outputs the filtered signal to a first reception switch 711. The first reception switch 711 can switch the output of the reception filter unit 703 to a cyclic shift processor 713 or bypass the cyclic shift processor under the control of the reception controller 721. That is, the first and second reception switches 711 and 715 output the filtered signal with or without it passing through the cyclic shift processor 713 under the control of the reception controller 721.

The cyclic shift processor 713 shifts the input data cyclically. The data block received from the transmission apparatus consists of the first and last halves that are interchanged in position. Accordingly, the cyclic shift processor 713 performs cyclic shift to output the data in the order of the first half and the last half.

If the overlapping factor is an even number and if a symbol as long as one data length is received, the reception controller 721 controls the first and second reception switches 711 and 715 to output via the cyclic shift processor 713. Otherwise, if the overlapping factor is an odd number or if a symbol is received repeatedly as many times as the overlapping factor, the reception controller 721 controls the first and second reception switches 711 and 715 to output the signal without passing through the cyclic shift processor 713.

The signal output with or without being cyclically shifted is input to an M-point FFT processor 705. Then the M-point FFT processor 705 performs FFT on the input signal under the control of the reception controller 721. At this time, if the received signal is a symbol equal in length to one data length, the M-point FFT processor 705 performs FFT as long as a single data length.

The data processed by the M-point FFT processor 705 is input to the one-tap equalizer 707. The one-tap equalizer 707 equalizes the data as long as one data length and outputs the equalized data to a demodulator 709 under the control of the reception controller 721. The demodulator 709 performs demodulation on the received data through a demodulation scheme corresponding to the modulation scheme used by the transmission apparatus.

The above described reception apparatus is configured to receive the signal carrying the data on which no cyclic shift has been performed by the transmission apparatus. Accordingly, the reception apparatus of FIG. 7B is used to receive the signal transmitted by the transmission apparatus configured as shown in FIG. 4B.

Figure 8:
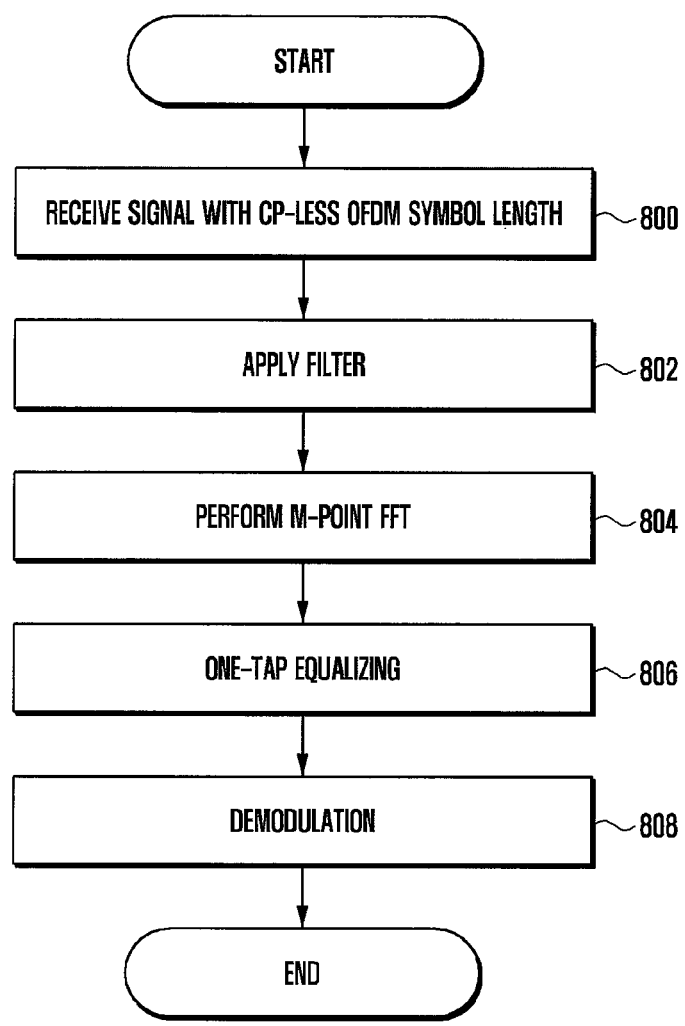
FIG. 8 is a flowchart illustrating a data reception procedure of a reception apparatus for receiving the FBMC symbol carrying data cyclically shifted by the transmission apparatus according to an embodiment of the present disclosure.

FIG. 8 is a flowchart illustrating a data reception procedure of a reception apparatus for receiving the FBMC symbol carrying data cyclically shifted by the transmission apparatus according to an embodiment of the present disclosure.

The reception controller 721 converts the signal having the length of one data block, i.e. FBMC symbol length, which is received by the signal reception unit 701 to a baseband signal or an intermediate band signal at step 800. The signal reception unit 701 can be informed or not about the FBMC symbol length of the received data through signaling from the system or the transmission apparatus.

Afterward, the reception controller 721 controls the reception filter unit 703 to perform filtering on the signal at step 802. At this time, the prototype filter can be used without modification. The length of the symbol to be filtered can be equal to one data length, i.e. one FBMC symbol length.

After the signal has been filtered, the reception controller 721 controls the M-point FFT processor 705 to perform FFT on the filtered signal at step 804. At this time, the FFT process is performed as long as a single data length.

Then the reception controller 721 controls the one-tap equalizer 707 to equalize the FFT-processed data at step 806. Next, the reception controller 721 controls the demodulator 709 to perform demodulation on the equalized data at step 808. The demodulator 709 performs demodulation on the received data through a demodulation scheme corresponding to the modulation scheme used by the transmission apparatus. In this way, the reception apparatus can acquire the data transmitted by the transmission apparatus.

The above described reception procedure is performed by the reception apparatus which is configured to receive the signal carrying the data which have been shifted cyclically by the transmission apparatus. Accordingly, the above described reception procedure can be performed by the reception apparatus configured as shown in FIG. 7A.

FIG. 9 is a flowchart illustrating a data reception procedure of a reception apparatus for receiving the FBMC symbol carrying data on which no cyclic shift has been performed in the transmission apparatus according to another embodiment of the present disclosure.

The reception controller 721 converts the signal having the length of one data block, i.e. FBMC symbol length, which is received by the signal reception unit 701 to a baseband signal or an intermediate band signal at step 900. The signal reception unit 701 can be informed or not about the FBMC symbol length of the received data through signaling from the system or the transmission apparatus.

Afterward, the reception controller 721 controls the reception filter unit 703 to perform filtering on the signal at step 802. At this time, the prototype filter can be used without modification. The length of the symbol to be filtered can be equal to one data length, i.e. one FBMC symbol length.

After the signal has been filtered, the reception controller 721 determines at step 904 whether the overlapping factor corresponding to the length of the received FBMC symbol is an even number. If it is determined at step 904 that the overlapping factor is an even number, the procedure goes to step 906; and, if it is determined otherwise, it goes to step 908.

If the procedure goes to step 906, this means that the transmission apparatus has transmitted the data without applying the cyclic shift thereto even though the overlapping factor is an even number. The reception controller 721 controls the first and second switches 711 and 715 to output the filtered data via the cyclic shift processor 713. Next, the reception controller 721 controls the cyclic shift processor 713 to perform cyclic shift on the received symbol at step 906. As described above, the cyclic shift is performed in such a way of interchanging the position of the two halves of the data. That is, if the overlapping factor is an even number, the first and last halves of the data are interchanged such that the first half follows the last half. The cyclic shift is performed to rearrange the first and last halves of the data such that the last half follows the first half.

Next, the reception controller 721 controls the M-point FFT processor 705 to perform FFT on the symbol in which the data has been cyclically shifted or repeated as many times as the overlapping factor at step 908. At this time, if the data having the FBMC symbol length are received, the reception controller 721 controls such that the FFT process is performed as long as the corresponding data length.

Then the reception controller 721 controls the one-tap equalizer 707 to equalize the FFT-processed data at step 910. Next, the reception controller 721 controls the demodulator 709 to perform demodulation on the equalized data at step 912. The demodulator 709 performs demodulation on the received data through a demodulation scheme corresponding to the modulation scheme used by the transmission apparatus. In this way, the reception apparatus can acquire the data transmitted by the transmission apparatus.

The above described reception procedure is performed by the reception apparatus which is configured to receive the signal carrying the data which have not been shifted cyclically by the transmission apparatus. Accordingly, the above described reception procedure can be performed by the reception apparatus configured as shown in FIG. 7B.

Figure 10A:
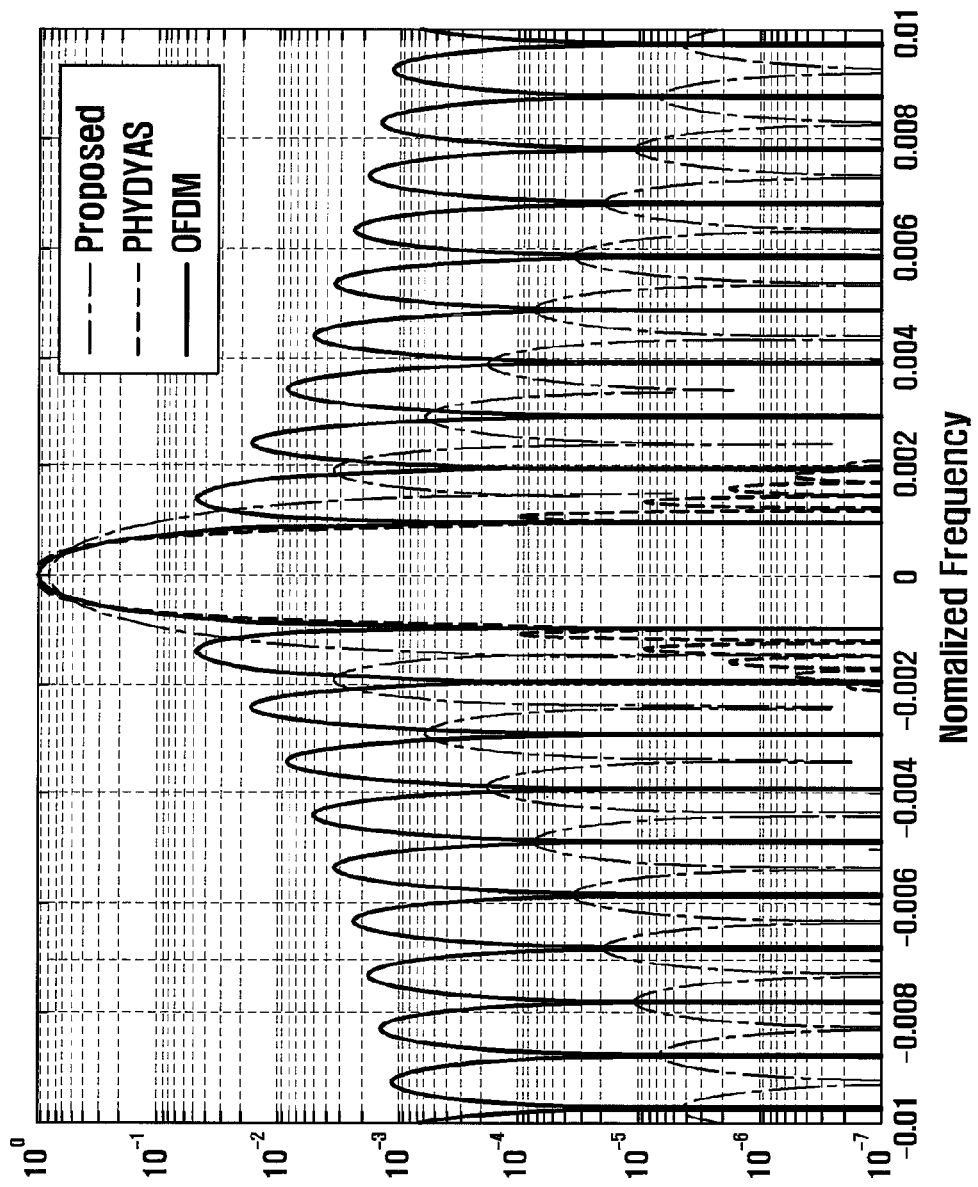
FIG. 10A is a graph illustrating a simulation result of Power Spectral Density distribution characteristic of a PHY-DYAS filter used widely in the FBMC system, a legacy filter used in the OFDM system, and a shortened compensation filter proposed in the present disclosure.

FIG. 10A is a graph illustrating a simulation result of Power Spectral Density distribution characteristic of a PHYDYAS filter used widely in the FBMC system, a legacy filter used in the OFDM system, and a shortened compensation filter proposed in the present disclosure.

Referring to FIG. 10A, the graph shows that the shortened compensation filter proposed in the present disclosure, although it is inferior to the PHYDYAS filter, is superior to the legacy filter used in the OFDM system in terms of PDS distribution characteristic.

Figure 10B:
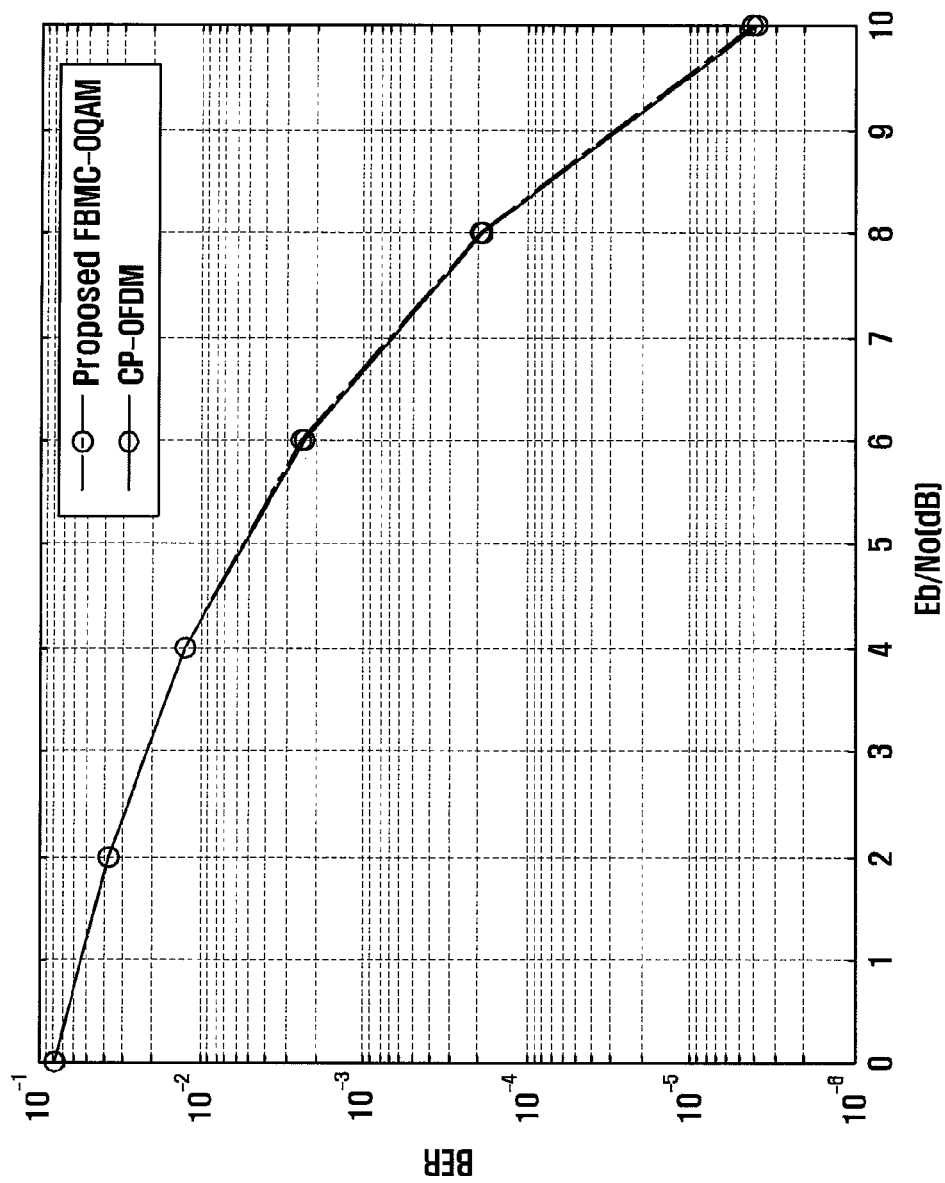
FIG. 10B is a graph illustrating a simulation result of the BER characteristic on the AWGN channel for the cases of applying the filter proposed in the present disclosure and transmitting data in an OFDM scheme.

FIG. 10B is a graph illustrating a simulation result of the BER characteristic on the AWGN channel for the cases of applying the filter proposed in the present disclosure and transmitting data in an OFDM scheme.

The simulation result of FIG. 10B is obtained under the condition that the proposed FBMC system uses the OQAM scheme while the OFDM system uses the QPSK modulation scheme. It is also assumed that the same FFT size of 1024 is applied to both the proposed FBMC system and the OFDM system. Finally, it is also assumed that the overlapping factor of the proposed FBMC system is 4.

Referring to the simulation result obtained in the above environment illustrated in FIG. 10B, the graph shows that the OFDM system which transmits the OFDM symbol with the CP and the FBMC system which transmits the data as long as one FBMC symbol length by applying the filter proposed in the present disclosure have similar performance degradations in the AWGN channel environment.

Figure 10C:
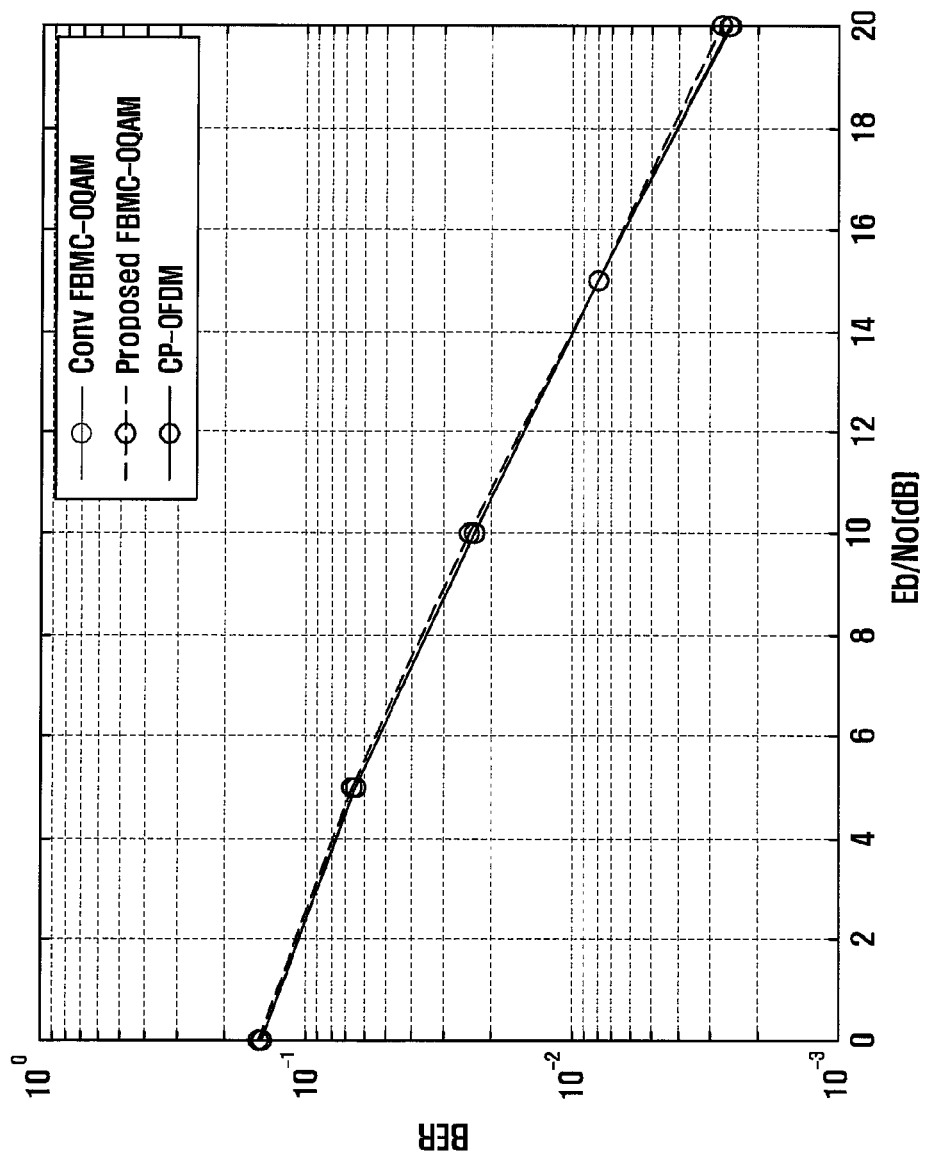
FIG. 10C is a graph illustrating a simulation result of the BER characteristic in transmitting data in the proposed FBMC system adopting the proposed filter, the conventional FBMC system, and the OFDM system in the ITU EVA channel environment.

FIG. 10C is a graph illustrating a simulation result of the BER characteristic in transmitting data in the proposed FBMC system adopting the proposed filter, the conventional FBMC system, and the OFDM system in the ITU EVA channel environment.

The simulation result of FIG. 10C is obtained under the condition that the proposed FBMC system and the conventional FBMC system use the OQAM scheme while the OFDM system uses the QPSK modulation scheme. It is also assumed that the same FFT size of 1024 is applied to all of the proposed and conventional FBMC systems and the OFDM system. It is also assumed that all of the proposed FBMC system, the conventional FBMC system, and the OFDM system use the one-tap equalizer and their overlapping factors is 4.

Referring to the simulation result obtained in the above environment illustrated in FIG. 10C, the graph shows that the FDM system which transmits the OFDM symbol with the CP, the proposed FBMC system which transmits the data as long as one FBMC symbol length, and the conventional FBMC system which transmits the data with the overlapping factor of 4 have similar performance degradations in the ITU EVA channel environment.

As described above, the packet transmission method of the present disclosure is advantageous in terms of protecting against transmission efficiency degradation caused by overlapped transmission and achieving a higher PSD efficiency compared with the OFDM scheme in an FBMC communication system. Also, the packet transmission method of the present disclosure is advantageous in terms of achieving a high BER even in a multi-path delay environment in the FBMC communication system.

The conventional FBMC-OQAM transmission/reception structure has a limitation in that singles should be transmitted in an OQAM format because of the intrinsic interference problem caused by the filtering overlap of data between neighbor subcarriers. This makes it difficult to combine legacy QAM-based techniques with a Multiple-Input Multiple-Output (MIMO). However, the packet transmission method of the present disclosure makes it possible to filter the even and odd data in a non-overlap manner and transmit the QAM signals without intrinsic interference using a complex domain filter. The packet transmission method of the present disclosure transmits OQAM signals in such an overlapped transmission technique and implements a weighted sum filtering on the time axis with the repetitive characteristic of Inverse Discrete Fourier Transform (IFFT) and FFT, resulting in reduction of complexity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A packet transmission method for use in a wireless communication system based on filter bank-based multi-carrier (FBMC), the method comprising:
   generating an offset quadrature amplitude modulation (OQAM) symbol by extracting a transmission data period from data blocks obtained by repeating a transmission data equal to an overlapping factor;
   performing inverse fast fourier transform (IFFT) on the OQAM symbol;
   shifting, if the overlapping factor is an even number, the IFFT-ed symbol cyclically;
   filtering the cyclically shifted symbol with a shortened compensation filter; and
   transmitting the filtered cyclically shifted symbol in an overlapped OQAM signal.

2. The method of claim 1, further comprising:
   filtering, if the overlapping factor is an odd number, the IFFT-ed symbol with the shortened compensation filter; and
   transmitting the filtered IFFT-ed symbol in the overlapped OQAM signal.

3. The method of claim 1, wherein the transmission data is a short burst data.

4. The method of claim 1, wherein extracting the transmission data period comprises extracting data between points distant as long as half of one data length backward and forward from a maximum energy point of a prototype filter used in the FBMC-based wireless communication system among the data blocks obtained by repeating the transmission data.

5. The method of claim 1, wherein shifting the IFFT-ed symbol cyclically comprises interchanging a position of a first half of the IFFT-ed symbol and a last half of the IFFT-ed symbol.

6. A packet transmission apparatus for use in a wireless communication system based on filter bank-based multi-carrier (FBMC), the apparatus comprising:
   a symbol generator configured to extract a transmission data period from data blocks obtained by repeating a transmission data equal to an overlapping factor and output an offset quadrature amplitude modulation (OQAM) symbol using the extracted transmission data period;
   an inverse fast fourier transform (IFFT) processor configured to perform IFFT on the OQAM symbol;
   a filter configured to filter the IFFT-ed symbol with a shortened compensation filter, and overlap the filtered symbol in an overlapped OQAM signal; and
   a controller configured to control a switch based on a size of the transmission data and the overlapping factor; and
   the switch configured to switch an output of the IFFT-ed symbol from the IFFT processor to perform a cycle shift using a cyclic shift processor or filter the IFFT-ed symbol using the controller.

7. The apparatus of claim 6, wherein the controller is configured to control, if the overlapping factor is an odd number, the switching to the IFFT-ed symbol to a shortened compensation filter.

8. The apparatus of claim 6, wherein the transmission data is a short burst data.

9. The apparatus of claim 6, wherein the controller is configured to control the symbol generator to extract data between points distant as far as half of one data length backward and forward from a maximum energy point of a prototype filter used in the FBMC-based wireless communication system among the data blocks obtained by repeating the transmission data.

10. The apparatus of claim 6, wherein the controller is configured to control the cyclic shift processor to interchange a position of a first half of the IFFT-ed symbol and a last half of the IFFT-ed symbol.

11. A packet reception method for use in a wireless communication system based on filter bank-based multi-carrier (FBMC), the method comprising:
    outputting a baseband signal by processing a symbol with an FBMC length;
    filtering the baseband signal with a prototype filter used in the wireless communication system to provide filtered data;
    shifting, if an overlapping factor of the wireless communication system is an even number, the filtered data cyclically;
    performing M-point fast fourier transform (FFT) on the cyclically shifted data;
    equalizing the FFT-ed cyclically shifted data; and
    demodulating the equalized data.

12. The method of claim 11, further comprising:
    performing, if the overlapping factor of the wireless communication system is an odd number, the M-point FFT on the filtered data;
    equalizing the FFT-ed filtered data; and
    demodulating the equalized FFT-ed filtered data.

13. The method of claim 11, wherein equalizing the FFT-ed filtered data comprises performing one-tap equalizing.

14. The method of claim 11, wherein shifting the filtered data cyclically comprises interchanging a position of a first half of the IFFT-ed symbol and a last half of the IFFT-ed symbol.

15. A packet reception apparatus for use in a wireless communication system based on filter bank-based multi-carrier (FBMC), the apparatus comprising:
    a signal receiver configured to output a baseband signal by processing a symbol with an FBMC length;
    a filter configured to filter the baseband signal with a prototype filter used in the wireless communication system to provide filtered data;
    a controller configured to control, if data bursts are received and an overlapping factor of the wireless communication system is an even number, a switch to switch the output filtered data to a cyclic shift processor;

the cyclic shift processor configured to shift the filtered data cyclically;

a fast fourier transform (FFT) processor configured to perform M-point FFT on the cyclically shifted data;

an equalizer configured to equalize the FFT-ed data;

a demodulator configured to demodulate the equalized data; and the switch configured to switch an output of the filtered data from the hardware controller to the cyclic shift processor or the FFT processor.

16. The apparatus of claim 15, wherein the equalizer is a one-tap equalizer.

17. The apparatus of claim 15, wherein the cyclic shift processor is configured to perform cyclic shift to interchange a position of a first half of the IFFT-ed symbol and a last half of the IFFT-ed symbol.

* * * * *